United States Patent
Zhang et al.

(10) Patent No.: US 12,518,491 B2
(45) Date of Patent: Jan. 6, 2026

(54) SUPPLEMENTING USER PERCEPTION AND EXPERIENCE WITH AUGMENTED REALITY (AR) AND ARTIFICIAL INTELLIGENCE (AI) TECHNIQUES UTILIZING AN ARTIFICIAL INTELLIGENCE (AI) AGENT

(71) Applicant: Meta Platforms, Inc., Menlo Park, CA (US)

(72) Inventors: Fan Zhang, Kirkland, WA (US); William Wong, Poughquag, NY (US); Anoop Kumar Sinha, Palo Alto, CA (US); Timothy Rosenberg, Arlington, VA (US); Chen Sun, Berkeley, CA (US); Gary Vu Nguyen, Edmonds, WA (US); Sofia Gallo Pavajeau, Seattle, WA (US); Agustya Mehta, San Carlos, CA (US); Johana Gabriela Coyoc Escudero, Milpitas, CA (US); Leonid Vladimirov, New York, NY (US); James Schultz, Redmond, WA (US)

(73) Assignee: Meta Platforms, Inc., Menlo Park, CA (US)

( * ) Notice: Subject to any disclaimer, the term of this patent is extended or adjusted under 35 U.S.C. 154(b) by 290 days.

(21) Appl. No.: 18/097,040

(22) Filed: Jan. 13, 2023

(65) Prior Publication Data
US 2024/0242442 A1   Jul. 18, 2024

(51) Int. Cl.
*G06T 19/00*   (2011.01)
*G02B 27/01*   (2006.01)
(Continued)

(52) U.S. Cl.
CPC ........ *G06T 19/006* (2013.01); *G02B 27/0172* (2013.01); *G06V 10/82* (2022.01); *G06V 10/84* (2022.01); *G02B 2027/0178* (2013.01)

(58) Field of Classification Search
CPC ...... G06T 19/006; G06V 10/82; G06V 10/84; G02B 27/0172; G02B 2027/0178
(Continued)

(56) References Cited

U.S. PATENT DOCUMENTS

| 9,576,460 | B2 * | 2/2017 | Dayal | G08B 21/02 |
| 11,663,781 | B1 * | 5/2023 | Alexander | G06F 3/013 |
| | | | | 345/633 |

(Continued)

*Primary Examiner* — Jacinta M Crawford
(74) *Attorney, Agent, or Firm* — Morgan, Lewis & Bockius LLP

(57) ABSTRACT

According to examples, a system for supplementing user perception and experience via augmented reality (AR), artificial intelligence (AI), and machine-learning (ML) techniques is described. The system may include a processor and a memory storing instructions. The processor, when executing the instructions, may cause the system to receive data associated with at least one of a location, context, or setting and determine, using at least one artificial intelligence (AI) model and at least one machine learning (ML) model, relationships between objects in the at least one of the location, context, or setting. The processor, when executing the instructions, may then apply an artificial intelligence (AI) agent to analyze the relationships and generate a three-dimensional (3D) mapping of the at least one of the location, context, or setting and provide an output to aid a user's perception and experience.

20 Claims, 9 Drawing Sheets

(51) Int. Cl.
*G06V 10/82* (2022.01)
*G06V 10/84* (2022.01)

(58) Field of Classification Search
USPC .......................................... 345/633
See application file for complete search history.

(56) References Cited

U.S. PATENT DOCUMENTS

| | | | | |
|---|---|---|---|---|
| 11,955,028 B1* | 4/2024 | Nash | ................... | G09B 21/009 |
| 2012/0143808 A1* | 6/2012 | Karins | ................... | G06N 7/01 |
| | | | | 706/46 |
| 2020/0409457 A1* | 12/2020 | Terrano | ................ | G02B 27/017 |

* cited by examiner

SUPPLEMENTING USER PERCEPTION AND EXPERIENCE WITH AUGMENTED REALITY (AR) AND ARTIFICIAL INTELLIGENCE (AI) TECHNIQUES UTILIZING AN ARTIFICIAL INTELLIGENCE (AI) AGENT

TECHNICAL FIELD

This patent application relates generally to generation and delivery of digital content, and more specifically, to systems and methods for supplementing user perception and experience via augmented reality (AR), artificial intelligence (AI), and machine-learning (ML) techniques utilizing an artificial intelligence (AI) agent.

BACKGROUND

Augmented reality (AR), artificial intelligence (AI), and machine-learning (ML) are modern technologies with potential for significant impact(s) on humanity. Today, these technologies are widely being used to revolutionize various aspects of modern life.

One such aspect may be aiding those with sensory impairment. For example, currently, there are roughly forty-three (43) million people living with blindness across the world, and two hundred ninety-five (295) million people with moderate to severe visual impairment.

In some instances, blindness and visual impairment may be dangerous and stressful, and even life-threatening. For example, for the blind or the visually impaired, crossing a street can be a challenging and risky everyday endeavor.

BRIEF DESCRIPTION OF DRAWINGS

Features of the present disclosure are illustrated by way of example and not limited in the following figures, in which like numerals indicate like elements. One skilled in the art will readily recognize from the following that alternative examples of the structures and methods illustrated in the figures can be employed without departing from the principles described herein.

DETAILED DESCRIPTION

Figure 1:
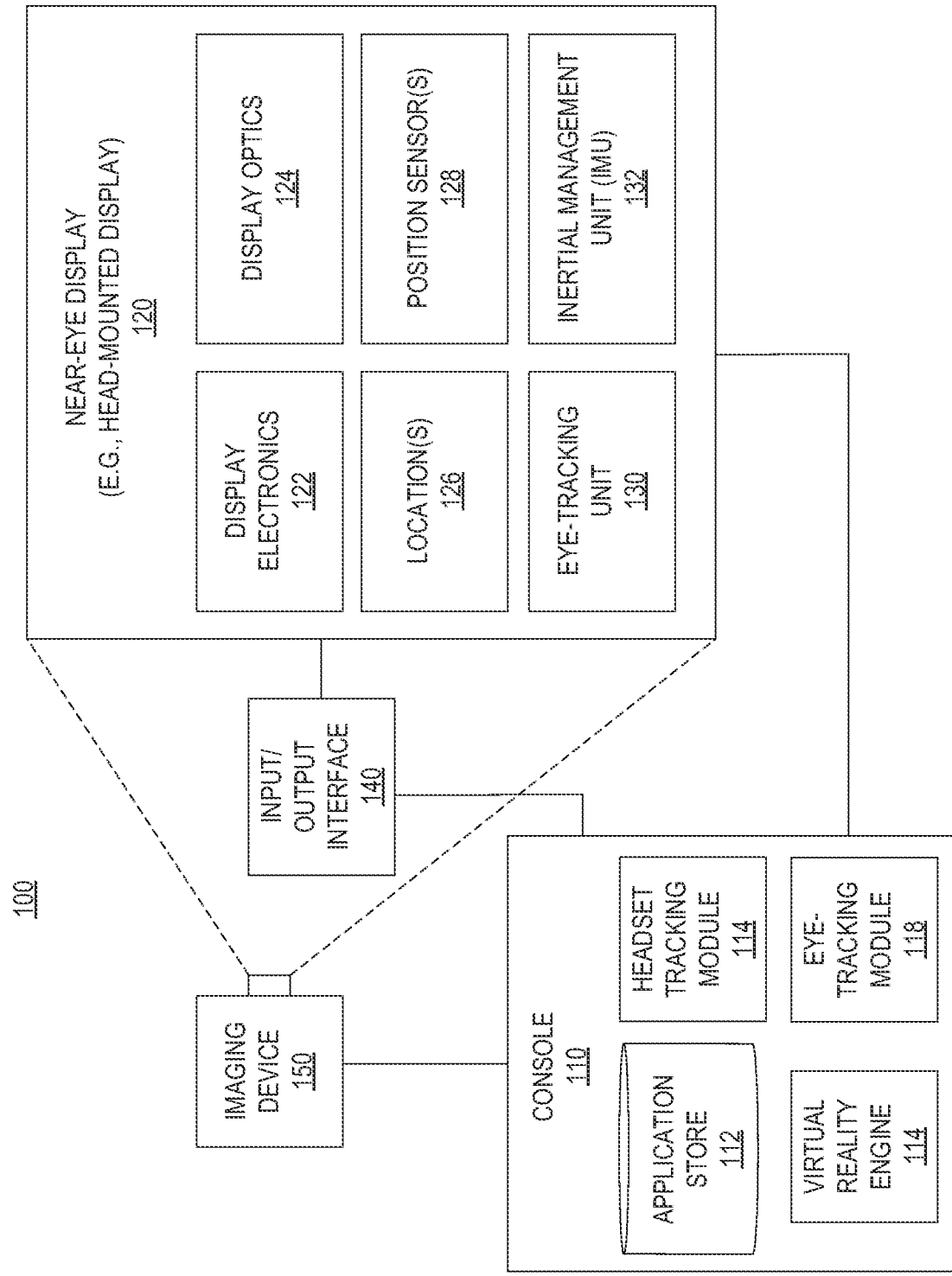
FIG. 1 illustrates a block diagram of an artificial reality system environment including a near-eye display, according to an example.

For simplicity and illustrative purposes, the present application is described by referring mainly to examples thereof. In the following description, numerous specific details are set forth in order to provide a thorough understanding of the present application. It will be readily apparent, however, that the present application may be practiced without limitation to these specific details. In other instances, some methods and structures readily understood by one of ordinary skill in the art have not been described in detail so as not to unnecessarily obscure the present application. As used herein, the terms "a" and "an" are intended to denote at least one of a particular element, the term "includes" means includes but not limited to, the term "including" means including but not limited to, and the term "based on" means based at least in part on.

Advances in content management and media distribution are causing users to engage with content on or from a variety of content platforms. As used herein, a "user" may include any user of a computing device or digital content delivery mechanism who receives or interacts with delivered content items, which may be visual, non-visual, or a combination thereof. Also, as used herein, "content", "digital content", "digital content item" and "content item" may refer to any digital data (e.g., a data file). Examples include, but are not limited to, digital images, digital video files, digital audio files, and/or streaming content. Additionally, the terms "content", "digital content item," "content item," and "digital item" may refer interchangeably to themselves or to portions thereof.

Augmented reality (AR), artificial intelligence (AI), and machine-learning (ML) are modern technologies with potential for significant impact. Today, these technologies are widely being used to revolutionize various aspects of modern life.

One such aspect may be aiding those with sensory impairment. For example, currently, there are roughly forty-three (43) million people living with blindness across the world, and two hundred ninety-five (295) million people with moderate to severe visual impairment.

Often, a user that may be blind or impaired visually may have multiple difficulties when navigating an environment. For example, a first difficulty may arise in reading of text (e.g., signs, billboards, etc.), and in particular with text that may be in service of navigation through the environment. Another difficulty may arise in relation to depth perception, such as difficulties that may arise in navigating an environment with varying depths (e.g., a subway). Yet another difficulty may arise with respect to clearly seeing a surrounding (environment), wherein identifying objects and understanding context of the surrounding may be crucial to the user's experience.

In some instances, blindness and visual impairment may be dangerous and stressful, and even life-threatening. For example, for the blind or the visually impaired, crossing a street can be a challenging and risky everyday endeavor. It may be appreciated that various other impairments, such as auditory or tactile impairments may be similarly challenging and may lead to risks as well.

Various existing technologies have been implemented to aid those with impairments. Cameras, such as those found on various consumer mobile devices, may be utilized to perform object detection and optical character recognition (OCR). Video technologies may offer visual interpretation services (e.g., via video calls). In addition, software-based technologies, such as voice recognition and text-to-speech output may be used to aid those with impairments. However, these technologies may come with drawbacks as well. For example, current technologies often may not necessarily offer haptic (e.g., tactile) inputs or outputs, and may not enable depth sensing as well.

Systems and methods described may provide supplementing of user perception and experience via augmented reality (AR), artificial intelligence (AI), and machine-learning (ML) techniques. In particular, by implementing one or more of augmented reality (AR), artificial intelligence (AI), and machine-learning (ML) techniques, the systems and methods described herein may provide enhanced perception and experience to those with sensory impairments. As used herein, "perception" may relate to, among other things, any aspect related to sensory aspects and/or activity of user. As used herein, "experience" may relate to, among other things, any aspect of a user being in a location, context, or setting. As used herein, "augmented reality" may include, among other things, any techniques and technologies that may enable integration of digital information with a user's environment (e.g., in real time), wherein the user may experience a real-world environment with (generated) perceptual information overlaid on top of it. As used herein, "artificial intelligence" may include, among other things, any techniques and technologies that may enable a machine (e.g., a computer) to mimic problem-solving and decision-making capabilities typically associated with the human mind. As used herein, "machine-learning" (or otherwise "machine learning") may include, among other things, any techniques and technologies that may enable a machine to imitate (e.g., mimic) intelligent human behavior.

In some examples, the systems and methods may implement and/or utilize one or more hardware devices (e.g., located in a relevant context or setting) to, among other things, provide contextual and settings information associated with a setting, location, and/or context. Examples of these hardware devices may include mobile devices, wearables (e.g., augmented reality (AR) enhanced eyeglasses, augmented reality (AR) or virtual reality (VR)) headsets, etc.), lifestyle aids (e.g., augmented reality (AR) enhanced gloves), and movement aids (e.g., augmented reality (AR) enhanced walking canes), and prosthesis. Examples of such contextual and settings information may include, among other things, image information (e.g., via a camera located on an eyeglass wearable or headset), audio information (e.g., via a microphone on a mobile device), sensor information (e.g. via a gyroscope or accelerometer located on a mobile device), and gesture or haptic information (e.g., located on a walking cane or prosthesis).

As will be discussed further below, each of these information types and device types may also be utilized to provide an output as well. By way of example, the systems and methods described may enable wearables to provide visual (e.g., image or video) or audio output, gesture, touch, and haptic outputs.

In addition, in some examples, the systems and methods described may utilize one or more hardware and software elements to provide enhanced perception and experience to users. So, as will be discussed further below, the systems and methods may utilize one or more computer devices to implement one or more artificial intelligence (AI) and machine-learning (ML) algorithms. In particular, in some examples, these one or more computer devices may be configured to implement an artificial intelligence (AI) "agent" that may, among other things, synthesize and analyze incoming contextual and settings data (e.g., via an augmented reality (AR) enhanced user device) with respect to artificial intelligence (AI) and machine-learning (ML) algorithms, and may provide supplemented user perception and experience for a user. As will be discussed further below, these one or more computer devices and one or more user devices may be implemented to overcome one or more of the difficulties discussed above.

Furthermore, machine-learning (ML) techniques implemented via the systems and methods described herein may also utilize (e.g., synthesize, analyze, etc.) incoming contextual and settings data (e.g., sensor data), and may use this data to provide contextual and settings information (e.g., to a user). By way of example, these machine-learning (ML) techniques may provide, among other things, object detection and large language model (LLM) processing. As a result, these techniques may provide various outputs, such as enabling users to read signs, appreciate depth and perspective, and identify objects associated with a context or setting.

In some examples, the systems and methods described may include a system, comprising a processor and a memory storing instructions, which when executed by the processor, cause the processor to receive data associated with at least one of a location, context, or setting, wherein the data comprises image data and sensor data from one or more hardware and software elements, determine, using at least one artificial intelligence (AI) model and at least one machine learning (ML) model, relationships between objects in the at least one of the location, context, or setting, apply an artificial intelligence (AI) agent to analyze the relationships determined by the at least one artificial intelligence (AI) model and the at least one machine learning (ML) model and generate a three-dimensional (3D) mapping of the at least one of the location, context, or setting, and provide an output to aid a user's perception and experience of the at least one of the location, context, or setting. In some examples, the systems and methods described may include instructions, when executed by the processor, further cause the processor implement the artificial intelligence (AI) agent to conduct a localization and mapping analysis. In some examples, the one or more hardware and software elements comprises augmented reality (AR) glasses. In some examples, the at least one artificial intelligence (AI) model comprises at least one of a large language model (LLM), a generative adversarial network (GAN), a tree-based model, a Bayesian network, a support vector, clustering, a kernel method, a spline, or a knowledge graph. In some examples, the instructions, when executed by the processor, further cause the processor to determine of a frame of reference associated with the at least one of the location, context, or setting, determine of a contextual point-of-view for the at least one of the location, context, or setting, and determine one or more objects of importance in the at least one of the location, context, or setting. In some examples, the instructions, when executed by the processor, further cause the processor to perform an image analysis associated with the at least one of the location, context, or setting. Also, in some examples, the instructions, when executed by the processor, further cause the processor to determine a risk associated with the at least one of the location, context, or setting and provide the output for the user based on the determined risk.

In some examples, the systems and methods described may include a method for supplementing user perception and experience, comprising receiving data associated with at least one of location, context, or setting, wherein the data comprises image data and sensor data from one or more hardware and software elements, determining, using at least one artificial intelligence (AI) model and at least one machine learning (ML) model, relationships between objects in the at least one of the location, context, or setting, applying an artificial intelligence (AI) agent to analyze the relationships determined by the at least one artificial intelligence (AI) model and the at least one machine learning (ML) model and generate a three-dimensional (3D) mapping of the at least one of the location, context, or setting, and providing an output to aid a user's perception and experience of the at least one of the location, context, or setting. In some examples, the method may further comprise implementing the artificial intelligence (AI) agent to conduct a localization and mapping analysis. In some examples, the method may comprise determining of a frame of reference associated with the at least one of the location, context, or setting, determining of a contextual point-of-view for the at least one of the location, context, or setting, and determining one or more objects of importance in the at least one of the location, context, or setting. In some examples, the method may comprise performing an image analysis associated with the at least one of the location, context, or setting.

In some examples, the systems and methods may include a non-transitory computer-readable storage medium having an executable stored thereon, which when executed instructs a processor to transmit data associated with at least one of a location, context, or setting, wherein the data comprises image data and sensor data from one or more hardware and software elements, determine, using at least one artificial intelligence (AI) model and at least one machine learning (ML) model, relationships between objects in the at least one of the location, context, or setting, and provide an output to aid a user's perception and experience of the at least one of the location, context, or setting. In some examples, the executable when executed further instructs the processor to apply an artificial intelligence (AI) agent to analyze the relationships determined by the at least one artificial intelligence (AI) model and the at least one machine learning (ML) model and generate a three-dimensional (3D) mapping of the at least one of the location, context, or setting. In some examples, the executable when executed further instructs the processor to implement a frame of reference analysis associated with the at least one of the location, context, or setting, implement a contextual point-of-view analysis for the at least one of the location, context, or setting, and display one or more objects of importance in the at least one of the location, context, or setting. In some examples, the executable when executed further instructs the processor to implement a localization and mapping analysis associated with the at least one of the location, context, or setting and implement an image analysis associated with the at least one of the location, context, or setting. In some examples, the executable when executed further instructs the processor to determine a risk associated with the at least one of the location, context, or setting and provide an output for the user based on the determined risk.

The systems and methods described herein may be implemented in various contexts. In some examples, the systems and methods described may enhance sensory capabilities of users whose sensory capabilities may be impaired by providing various augmented sensory information and experiences. For examples, in some instances, the systems and methods may enhance sensory capabilities for visually impaired users by translating visual input (e.g., gathered via a camera on a piece of eyewear) into audio and touch modalities.

Indeed, in some examples, the systems and methods described may supplement and surpass existing solutions (e.g., mobility aids, screen readers, etc.) by providing contextual-specific and object-oriented identification and understanding. That is, in some examples, the systems and methods may be able to, among other things, identify and understand a context in which a user may be operating, and further may be able to identify and describe objects associated with the context as well. As a result, in some instances, the systems and methods may be able to provide a user experience of a context or setting that may be more "comprehensive" and "natural". So, in one particular example, a visually impaired user in an unfamiliar setting may ask, "[w]hat's in front of me?" In this example, the systems and methods described may be able to analyze any and all available associated information (e.g., via use of the artificial intelligence (AI) and machine learning (ML) techniques described), and respond via a microphone located on a mobile phone that the user may be carrying, "You are looking at a subway line. There are two people ahead of you." In some examples, the systems and methods may also provide supplemental visual information (e.g., via an augmented reality (AR) eyeglass) that may enhance the user's visual perception and/or improve a user's decision-making as well.

In some examples, the information associated with supplementing user perception and experience via augmented reality (AR), artificial intelligence (AI), and machine-learning (ML) techniques utilizing an artificial intelligence (AI) agent may be gathered and utilized according to various policies. For example, in particular embodiments, privacy settings may allow users to review and control, via opt in or opt out selections, as appropriate, how their data may be collected, used, stored, shared, or deleted by the systems and methods or by other entities (e.g., other users or third-party systems), and for a particular purpose. The systems and methods may present users with an interface indicating what data is being collected, used, stored, or shared by the systems and methods described (or other entities), and for what purpose. Furthermore, the systems and methods may present users with an interface indicating how such data may be collected, used, stored, or shared by particular processes of the systems and methods or other processes (e.g., internal research, advertising algorithms, machine-learning algorithms). In some examples, a user may have to provide prior authorization before the systems and methods may collect, use, store, share, or delete data associated with the user for any purpose.

Moreover, in particular embodiments, privacy policies may limit the types of data that may be collected, used, or shared by particular processes of the systems and methods for a particular purpose (as described further below). In some examples, the systems and methods may present users with an interface indicating the particular purpose for which data is being collected, used, or shared. In some examples, the privacy policies may ensure that only necessary and relevant data may be collected, used, or shared for the particular purpose, and may prevent such data from being collected, used, or shared for unauthorized purposes.

Also, in some examples, the collection, usage, storage, and sharing of any data may be subject to data minimization policies, which may limit how such data that may be collected, used, stored, or shared by the systems and methods, other entities (e.g., other users or third-party systems), or particular processes (e.g., internal research, advertising algorithms, machine-learning algorithms) for a particular purpose. In some examples, the data minimization policies may ensure that only relevant and necessary data may be accessed by such entities or processes for such purposes.

In addition, it should be appreciated that in some examples, the deletion of any data may be subject to data retention policies, which may limit the duration such data that may be user or stored by the systems and methods (or by other entities), or by particular processes (e.g., internal research, advertising algorithms, machine-learning algorithms, etc.) for a particular purpose before being automatically deleted, de-identified, or otherwise made inaccessible. In some examples, the data retention policies may ensure that data may be accessed by such entities or processes only for the duration it is relevant and necessary for such entities or processes for the particular purpose. In particular examples, privacy settings may allow users to review any of their data stored by the systems and methods or other entities (e.g., third-party systems) for any purpose, and delete such data when requested by the user.

FIG. 1 illustrates a block diagram of an artificial reality system environment 100 including a near-eye display, according to an example. As used herein, a "near-eye display" may refer to a device (e.g., an optical device) that may be in close proximity to a user's eye. As used herein, "artificial reality" may refer to aspects of, among other things, a "metaverse" or an environment of real and virtual elements, and may include use of technologies associated with virtual reality (VR), augmented reality (AR), and/or mixed reality (MR). As used herein a "user" may refer to a user or wearer of a "near-eye display."

As shown in FIG. 1, the artificial reality system environment 100 may include a near-eye display 120, an optional external imaging device 150, and an optional input/output interface 140, each of which may be coupled to a console 110. The console 110 may be optional in some instances as the functions of the console 110 may be integrated into the near-eye display 120. In some examples, the near-eye display 120 may be a head-mounted display (HMD) that presents content to a user.

In some instances, for a near-eye display system, it may generally be desirable to expand an eyebox, reduce display haze, improve image quality (e.g., resolution and contrast), reduce physical size, increase power efficiency, and increase or expand field of view (FOV). As used herein, "field of view" (FOV) may refer to an angular range of an image as seen by a user, which is typically measured in degrees as observed by one eye (for a monocular HMD) or both eyes (for binocular HMDs). Also, as used herein, an "eyebox" may be a two-dimensional box that may be positioned in front of the user's eye from which a displayed image from an image source may be viewed.

In some examples, in a near-eye display system, light from a surrounding environment may traverse a "see-through" region of a waveguide display (e.g., a transparent substrate) to reach a user's eyes. For example, in a near-eye display system, light of projected images may be coupled into a transparent substrate of a waveguide, propagate within the waveguide, and be coupled or directed out of the waveguide at one or more locations to replicate exit pupils and expand the eyebox.

In some examples, the near-eye display 120 may include one or more rigid bodies, which may be rigidly or non-rigidly coupled to each other. In some examples, a rigid coupling between rigid bodies may cause the coupled rigid bodies to act as a single rigid entity, while in other examples, a non-rigid coupling between rigid bodies may allow the rigid bodies to move relative to each other.

In some examples, the near-eye display 120 may be implemented in any suitable form-factor, including a HMD, a pair of glasses, or other similar wearable eyewear or device. Examples of the near-eye display 120 are further described below with respect to FIG. 2 and FIG. 3. Additionally, in some examples, the functionality described herein may be used in a HMD or headset that may combine images of an environment external to the near-eye display 120 and artificial reality content (e.g., computer-generated images). Therefore, in some examples, the near-eye display 120 may augment images of a physical, real-world environment external to the near-eye display 120 with generated and/or overlaid digital content (e.g., images, video, sound, etc.) to present an augmented reality to a user.

In some examples, the near-eye display 120 may include any number of display electronics 122, display optics 124, and an eye-tracking unit 130. In some examples, the near-eye display 120 may also include one or more locators 126, one or more position sensors 128, and an inertial measurement unit (IMU) 132. In some examples, the near-eye display 120 may omit any of the eye-tracking unit 130, the one or more locators 126, the one or more position sensors 128, and the inertial measurement unit (IMU) 132, or may include additional elements.

In some examples, the display electronics 122 may display or facilitate the display of images to the user according to data received from, for example, the optional console 110. In some examples, the display electronics 122 may include one or more display panels. In some examples, the display electronics 122 may include any number of pixels to emit light of a predominant color such as red, green, blue, white, or yellow. In some examples, the display electronics 122 may display a three-dimensional (3D) image, e.g., using stereoscopic effects produced by two-dimensional panels, to create a subjective perception of image depth.

In some examples, the display optics 124 may display image content optically (e.g., using optical waveguides and/or couplers) or magnify image light received from the display electronics 122, correct optical errors associated with the image light, and/or present the corrected image light to a user of the near-eye display 120. In some examples, the display optics 124 may include a single optical element or any number of combinations of various optical elements as well as mechanical couplings to maintain relative spacing and orientation of the optical elements in the combination. In some examples, one or more optical elements in the display optics 124 may have an optical coating, such as an anti-reflective coating, a reflective coating, a filtering coating, and/or a combination of different optical coatings.

In some examples, the display optics 124 may also be designed to correct one or more types of optical errors, such as two-dimensional optical errors, three-dimensional optical errors, or any combination thereof. Examples of two-dimensional errors may include barrel distortion, pincushion distortion, longitudinal chromatic aberration, and/or transverse chromatic aberration. Examples of three-dimensional errors may include spherical aberration, chromatic aberration field curvature, and astigmatism.

In some examples, the one or more locators 126 may be objects located in specific positions relative to one another and relative to a reference point on the near-eye display 120. In some examples, the optional console 110 may identify the one or more locators 126 in images captured by the optional external imaging device 150 to determine the artificial reality headset's position, orientation, or both. The one or more locators 126 may each be a light-emitting diode (LED), a corner cube reflector, a reflective marker, a type of light source that contrasts with an environment in which the near-eye display 120 operates, or any combination thereof.

In some examples, the external imaging device 150 may include one or more cameras, one or more video cameras, any other device capable of capturing images including the one or more locators 126, or any combination thereof. The optional external imaging device 150 may be configured to detect light emitted or reflected from the one or more locators 126 in a field of view of the optional external imaging device 150.

In some examples, the one or more position sensors 128 may generate one or more measurement signals in response to motion of the near-eye display 120. Examples of the one or more position sensors 128 may include any number of accelerometers, gyroscopes, magnetometers, and/or other motion-detecting or error-correcting sensors, or any combination thereof.

In some examples, the inertial measurement unit (IMU) 132 may be an electronic device that generates fast calibration data based on measurement signals received from the one or more position sensors 128. The one or more position sensors 128 may be located external to the inertial measurement unit (IMU) 132, internal to the inertial measurement unit (IMU) 132, or any combination thereof. Based on the one or more measurement signals from the one or more position sensors 128, the inertial measurement unit (IMU) 132 may generate fast calibration data indicating an estimated position of the near-eye display 120 that may be relative to an initial position of the near-eye display 120. For example, the inertial measurement unit (IMU) 132 may integrate measurement signals received from accelerometers over time to estimate a velocity vector and integrate the velocity vector over time to determine an estimated position of a reference point on the near-eye display 120. Alternatively, the inertial measurement unit (IMU) 132 may provide the sampled measurement signals to the optional console 110, which may determine the fast calibration data.

The eye-tracking unit 130 may include one or more eye-tracking systems. As used herein, "eye tracking" may refer to determining an eye's position or relative position, including orientation, location, and/or gaze of a user's eye. In some examples, an eye-tracking system may include an imaging system that captures one or more images of an eye and may optionally include a light emitter, which may generate light that is directed to an eye such that light reflected by the eye may be captured by the imaging system. In other examples, the eye-tracking unit 130 may capture reflected radio waves emitted by a miniature radar unit. These data associated with the eye may be used to determine or predict eye position, orientation, movement, location, and/or gaze.

In some examples, the near-eye display 120 may use the orientation of the eye to introduce depth cues (e.g., blur image outside of the user's main line of sight), collect heuristics on the user interaction in the virtual reality (VR) media (e.g., time spent on any particular subject, object, or frame as a function of exposed stimuli), some other functions that are based in part on the orientation of at least one of the user's eyes, or any combination thereof. In some examples, because the orientation may be determined for both eyes of the user, the eye-tracking unit 130 may be able to determine where the user is looking or predict any user patterns, etc.

In some examples, the input/output interface 140 may be a device that allows a user to send action requests to the optional console 110. As used herein, an "action request" may be a request to perform a particular action. For example, an action request may be to start or to end an application or to perform a particular action within the application. The input/output interface 140 may include one or more input devices. Example input devices may include a keyboard, a mouse, a game controller, a glove, a button, a touch screen, or any other suitable device for receiving action requests and communicating the received action requests to the optional console 110. In some examples, an action request received by the input/output interface 140 may be communicated to the optional console 110, which may perform an action corresponding to the requested action.

In some examples, the optional console 110 may provide content to the near-eye display 120 for presentation to the user in accordance with information received from one or more of external imaging device 150, the near-eye display 120, and the input/output interface 140. For example, in the example shown in FIG. 1, the optional console 110 may include an application store 112, a headset tracking module 114, a virtual reality engine 116, and an eye-tracking module 118. Some examples of the optional console 110 may include different or additional modules than those described in conjunction with FIG. 1. Functions further described below may be distributed among components of the optional console 110 in a different manner than is described here.

In some examples, the optional console 110 may include a processor and a non-transitory computer-readable storage medium storing instructions executable by the processor. The processor may include multiple processing units executing instructions in parallel. The non-transitory computer-readable storage medium may be any memory, such as a hard disk drive, a removable memory, or a solid-state drive (e.g., flash memory or dynamic random access memory (DRAM)). In some examples, the modules of the optional console 110 described in conjunction with FIG. 1 may be encoded as instructions in the non-transitory computer-readable storage medium that, when executed by the processor, cause the processor to perform the functions further described below. It should be appreciated that the optional console 110 may or may not be needed or the optional console 110 may be integrated with or separate from the near-eye display 120.

In some examples, the application store 112 may store one or more applications for execution by the optional console 110. An application may include a group of instructions that, when executed by a processor, generates content for presentation to the user. Examples of the applications may include gaming applications, conferencing applications, video playback application, or other suitable applications.

In some examples, the headset tracking module 114 may track movements of the near-eye display 120 using slow calibration information from the external imaging device 150. For example, the headset tracking module 114 may determine positions of a reference point of the near-eye display 120 using observed locators from the slow calibration information and a model of the near-eye display 120. Additionally, in some examples, the headset tracking module 114 may use portions of the fast calibration information, the slow calibration information, or any combination thereof, to predict a future location of the near-eye display 120. In some examples, the headset tracking module 114 may provide the estimated or predicted future position of the near-eye display 120 to the virtual reality engine 116.

In some examples, the virtual reality engine 116 may execute applications within the artificial reality system environment 100 and receive position information of the near-eye display 120, acceleration information of the near-eye display 120, velocity information of the near-eye display 120, predicted future positions of the near-eye display 120, or any combination thereof from the headset tracking module 114. In some examples, the virtual reality engine 116 may also receive estimated eye position and orientation information from the eye-tracking module 118. Based on the received information, the virtual reality engine 116 may determine content to provide to the near-eye display 120 for presentation to the user.

In some examples, the eye-tracking module 118 may receive eye-tracking data from the eye-tracking unit 130 and determine the position of the user's eye based on the eye tracking data. In some examples, the position of the eye may include an eye's orientation, location, or both relative to the near-eye display 120 or any element thereof. So, in these examples, because the eye's axes of rotation change as a function of the eye's location in its socket, determining the eye's location in its socket may allow the eye-tracking module 118 to more accurately determine the eye's orientation.

In some examples, a location of a projector of a display system may be adjusted to enable any number of design modifications. For example, in some instances, a projector may be located in front of a viewer's eye (e.g., "front-mounted" placement). In a front-mounted placement, in some examples, a projector of a display system may be located away from a user's eyes (e.g., "world-side"). In some examples, a head-mounted display (HMD) device may utilize a front-mounted placement to propagate light towards a user's eye(s) to project an image.

Figure 2:
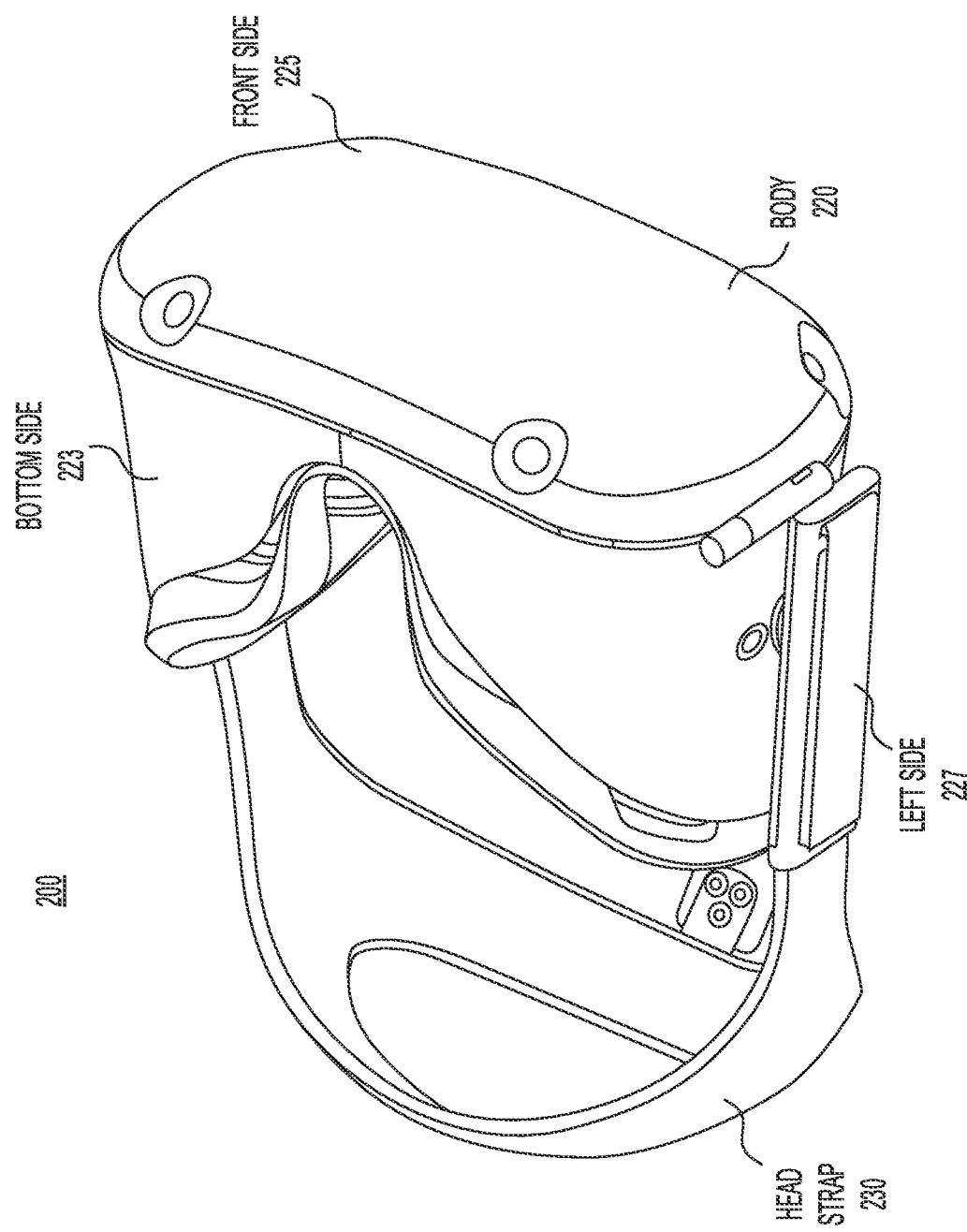
FIG. 2 illustrates a perspective view of a near-eye display in the form of a head-mounted display (HMD) device, according to an example.

FIG. 2 illustrates a perspective view of a near-eye display in the form of a head-mounted display (HMD) device 200, according to an example. In some examples, the HMD device 200 may be a part of a virtual reality (VR) system, an augmented reality (AR) system, a mixed reality (MR) system, another system that uses displays or wearables, or any combination thereof. In some examples, the HMD device 200 may include a body 220 and a head strap 230. FIG. 2 shows a bottom side 223, a front side 225, and a left side 227 of the body 220 in the perspective view. In some examples, the head strap 230 may have an adjustable or extendible length. In particular, in some examples, there may be a sufficient space between the body 220 and the head strap 230 of the HMD device 200 for allowing a user to mount the HMD device 200 onto the user's head. In some examples, the HMD device 200 may include additional, fewer, and/or different components.

In some examples, the HMD device 200 may present, to a user, media or other digital content including virtual and/or augmented views of a physical, real-world environment with computer-generated elements. Examples of the media or digital content presented by the HMD device 200 may include images (e.g., two-dimensional (2D) or three-dimensional (3D) images), videos (e.g., 2D or 3D videos), audio, or any combination thereof. In some examples, the images and videos may be presented to each eye of a user by one or more display assemblies (not shown in FIG. 2) enclosed in the body 220 of the HMD device 200.

In some examples, the HMD device 200 may include various sensors (not shown), such as depth sensors, motion sensors, position sensors, and/or eye tracking sensors. Some of these sensors may use any number of structured or unstructured light patterns for sensing purposes. In some examples, the HMD device 200 may include an input/output interface 140 for communicating with a console 110, as described with respect to FIG. 1. In some examples, the HMD device 200 may include a virtual reality engine (not shown), but similar to the virtual reality engine 116 described with respect to FIG. 1, that may execute applications within the HMD device 200 and receive depth information, position information, acceleration information, velocity information, predicted future positions, or any combination thereof of the HMD device 200 from the various sensors.

In some examples, the information received by the virtual reality engine 116 may be used for producing a signal (e.g., display instructions) to the one or more display assemblies. In some examples, the HMD device 200 may include locators (not shown), but similar to the virtual locators 126 described in FIG. 1, which may be located in fixed positions on the body 220 of the HMD device 200 relative to one another and relative to a reference point. Each of the locators may emit light that is detectable by an external imaging device. This may be useful for the purposes of head tracking or other movement/orientation. It should be appreciated that other elements or components may also be used in addition or in lieu of such locators.

It should be appreciated that in some examples, a projector mounted in a display system may be placed near and/or closer to a user's eye (e.g., "eye-side"). In some examples, and as discussed herein, a projector for a display system shaped liked eyeglasses may be mounted or positioned in a temple arm (e.g., a top far corner of a lens side) of the eyeglasses. It should be appreciated that, in some instances, utilizing a back-mounted projector placement may help to reduce size or bulkiness of any required housing required for a display system, which may also result in a significant improvement in user experience for a user.

Figure 3:
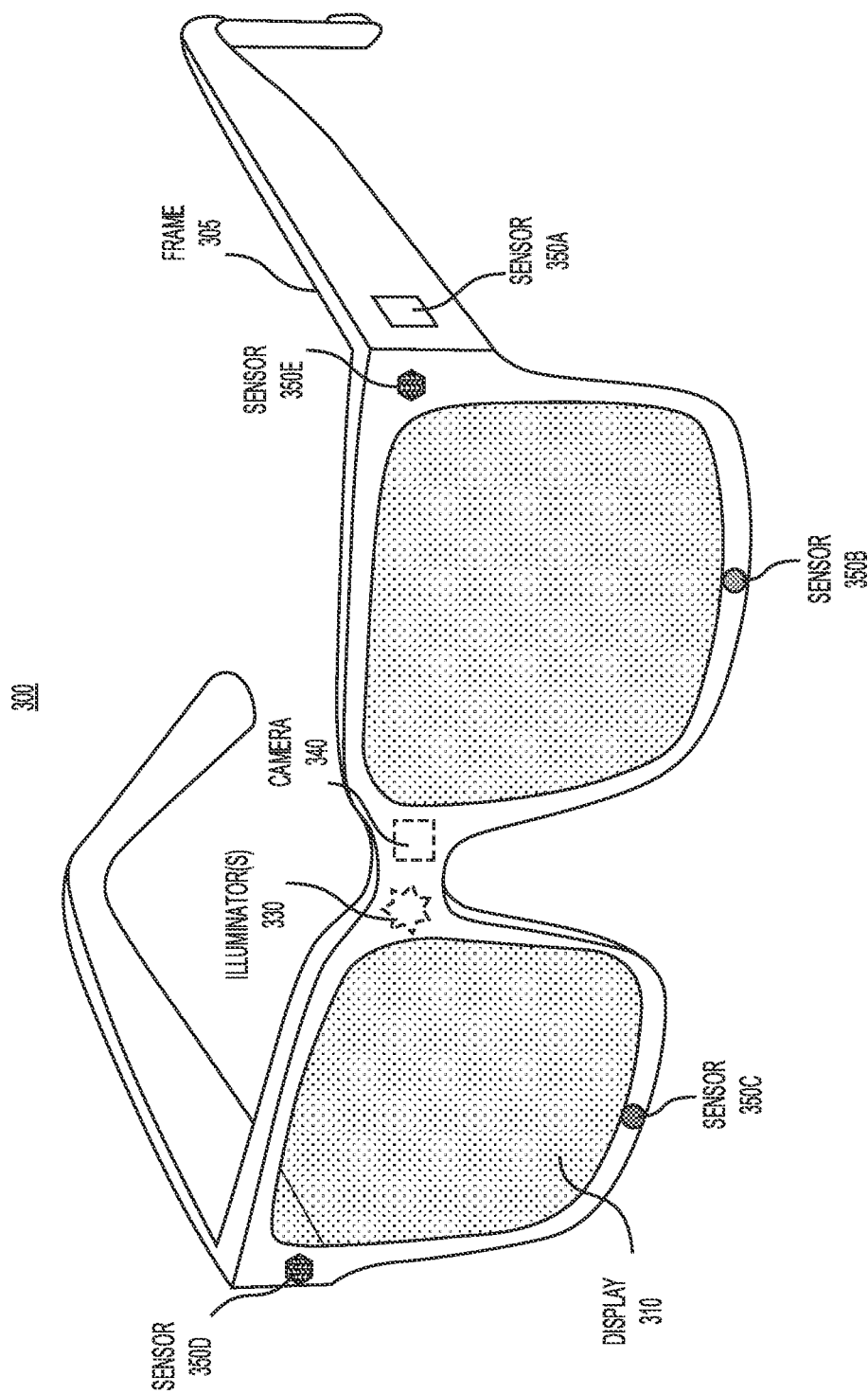
FIG. 3 is a perspective view of a near-eye display in the form of a pair of glasses, according to an example.

FIG. 3 is a perspective view of a near-eye display 300 in the form of a pair of glasses (or other similar eyewear), according to an example. In some examples, the near-eye display 300 may be a specific implementation of near-eye display 120 of FIG. 1, and may be configured to operate as a virtual reality display, an augmented reality display, and/or a mixed reality display.

In some examples, the near-eye display 300 may include a frame 305 and a display 310. In some examples, the display 310 may be configured to present media or other content to a user. In some examples, the display 310 may include display electronics and/or display optics, similar to components described with respect to FIGS. 1-2. For example, as described above with respect to the near-eye display 120 of FIG. 1, the display 310 may include a liquid crystal display (LCD) display panel, a light-emitting diode (LED) display panel, or an optical display panel (e.g., a waveguide display assembly). In some examples, the display 310 may also include any number of optical components, such as waveguides, gratings, lenses, mirrors, etc.

In some examples, the near-eye display 300 may further include various sensors 350a, 350b, 350c, 350d, and 350e on or within a frame 305. In some examples, the various sensors 350a-350e may include any number of depth sensors, motion sensors, position sensors, inertial sensors, and/or ambient light sensors, as shown. In some examples, the various sensors 350a-350e may include any number of image sensors configured to generate image data representing different fields of views in one or more different directions. In some examples, the various sensors 350a-350e may be used as input devices to control or influence the displayed content of the near-eye display 300, and/or to provide an interactive virtual reality (VR), augmented reality (AR), and/or mixed reality (MR) experience to a user of the near-eye display 300. In some examples, the various sensors 350a-350e may also be used for stereoscopic imaging or other similar application.

In some examples, the near-eye display 300 may further include one or more illuminators 330 to project light into a physical environment. The projected light may be associated with different frequency bands (e.g., visible light, infra-red light, ultra-violet light, etc.), and may serve various purposes. In some examples, the one or more illuminators 330 may be used as locators, such as the one or more locators 126 described above with respect to FIGS. 1-2.

In some examples, the near-eye display 300 may also include a camera 340 or other image capture unit. The camera 340, for instance, may capture images of the physical environment in the field of view. In some instances, the captured images may be processed, for example, by a virtual reality engine (e.g., the virtual reality engine 116 of FIG. 1) to add virtual objects to the captured images or modify physical objects in the captured images, and the processed images may be displayed to the user by the display 310 for augmented reality (AR) and/or mixed reality (MR) applications.

Figure 4:
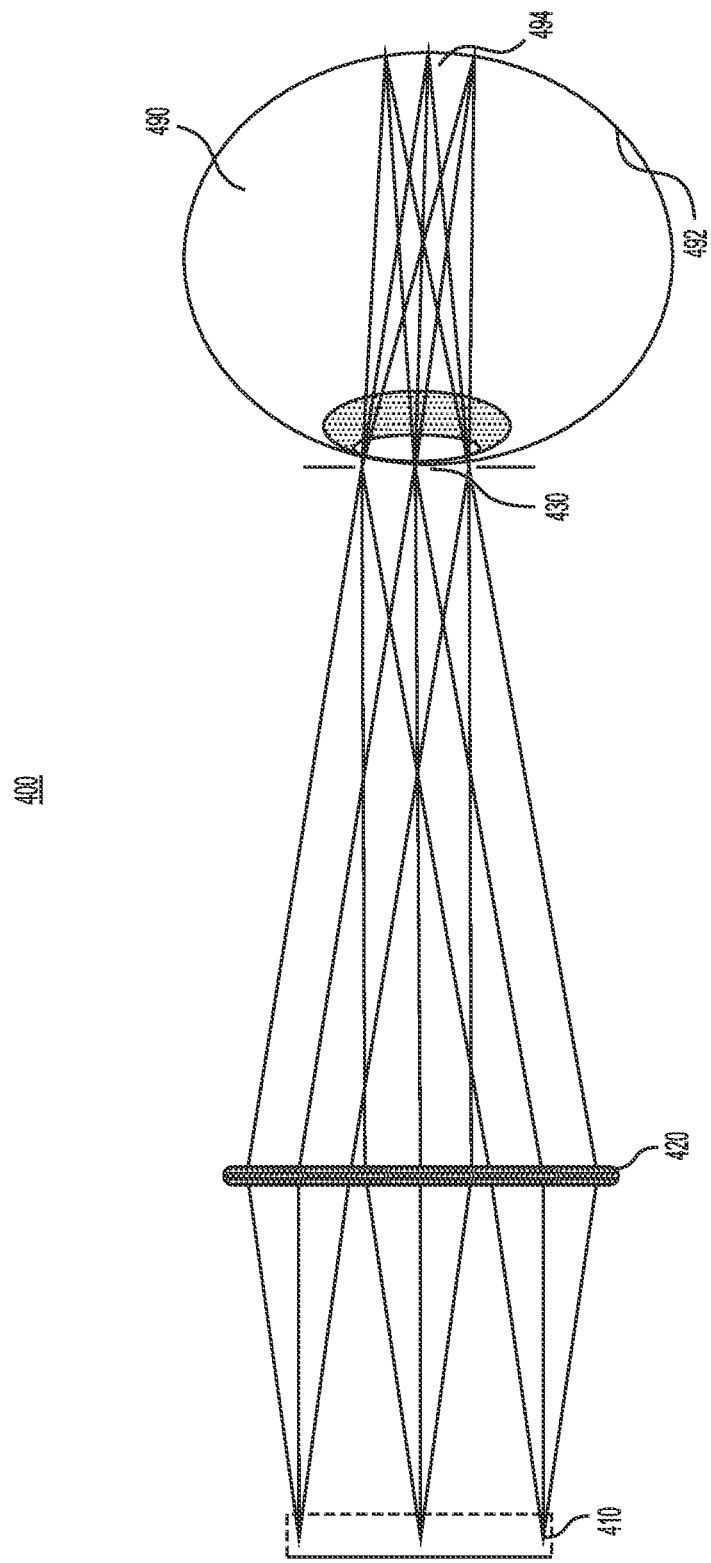
FIG. 4 illustrates a schematic diagram of an optical system in a near-eye display system, according to an example.

FIG. 4 illustrates a schematic diagram of an optical system 400 in a near-eye display system, according to an example. In some examples, the optical system 400 may include an image source 410 and any number of projector optics 420 (which may include waveguides having gratings as discussed herein). In the example shown in FIG. 4, the image source 410 may be positioned in front of the projector optics 420 and may project light toward the projector optics 420. In some examples, the image source 410 may be located outside of the field of view (FOV) of a user's eye 490. In this case, the projector optics 420 may include one or more reflectors, refractors, or directional couplers that may deflect light from the image source 410 that is outside of the field of view (FOV) of the user's eye 490 to make the image source 410 appear to be in front of the user's eye 490. Light from an area (e.g., a pixel or a light emitting device) on the image source 410 may be collimated and directed to an exit pupil 430 by the projector optics 420. Thus, objects at different spatial locations on the image source 410 may appear to be objects far away from the user's eye 490 in different viewing angles (e.g., fields of view (FOV)). The collimated light from different viewing angles may then be focused by the lens of the user's eye 490 onto different locations on retina 492 of the user's eye 490. For example, at least some portions of the light may be focused on a fovea 494 on the retina 492. Collimated light rays from an area on the image source 410 and incident on the user's eye 490 from a same direction may be focused onto a same location on the retina 492. As such, a single image of the image source 410 may be formed on the retina 492.

In some instances, a user experience of using an artificial reality system may depend on several characteristics of the optical system, including field of view (FOV), image quality (e.g., angular resolution), size of the eyebox (to accommodate for eye and head movements), and brightness of the light (or contrast) within the eyebox. Also, in some examples, to create a fully immersive visual environment, a large field of view (FOV) may be desirable because a large field of view (FOV) (e.g., greater than about 60°) may provide a sense of "being in" an image, rather than merely viewing the image. In some instances, smaller fields of view may also preclude some important visual information. For example, a head-mounted display (HMD) system with a small field of view (FOV) may use a gesture interface, but users may not readily see their hands in the small field of view (FOV) to be sure that they are using the correct motions or movements. On the other hand, wider fields of view may require larger displays or optical systems, which may influence the size, weight, cost, and/or comfort of the head-mounted display (HMD) itself.

In some examples, a waveguide may be utilized to couple light into and/or out of a display system. In particular, in some examples and as described further below, light of projected images may be coupled into or out of the waveguide using any number of reflective or diffractive optical elements, such as gratings. For example, as described further below, one or more volume Bragg gratings (VBGs) may be utilized in a waveguide-based, back-mounted display system (e.g., a pair of glasses or similar eyewear).

In some examples, one or more volume Bragg gratings (VBGs) (or two portions of a same grating) may be used to diffract display light from a projector to a user's eye. Furthermore, in some examples, the one or more volume Bragg gratings (VBGs) may also help compensate for any dispersion of display light caused by each other to reduce the overall dispersion in a waveguide-based display system.

Figure 5A:
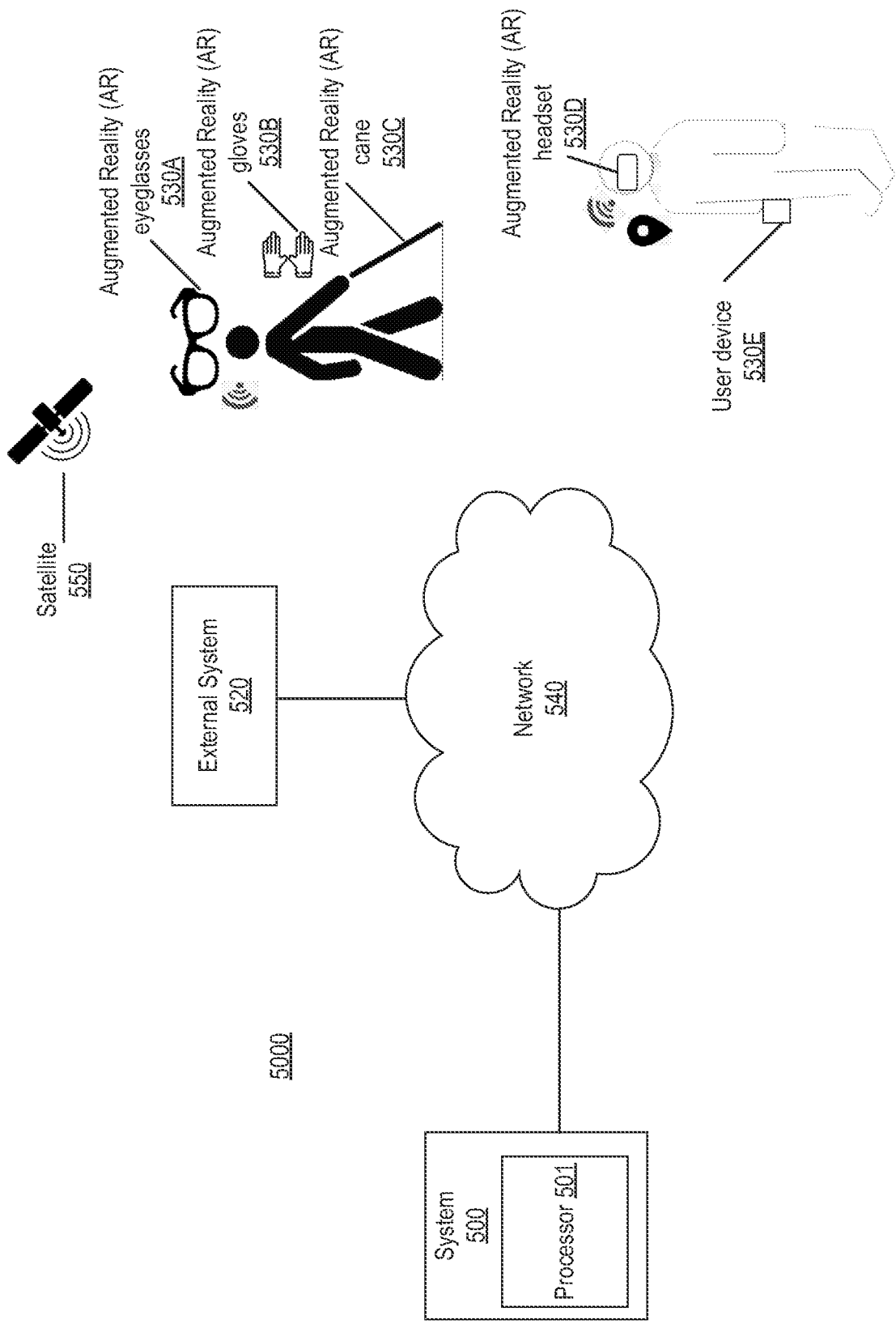
FIGS. 5A-5B illustrates a block diagram of a system environment, including a system, to provide supplementing user of perception and experience via augmented reality (AR), artificial intelligence (AI), and machine-learning (ML) techniques utilizing an artificial intelligence (AI) agent, according to an example.
Figure 5B:
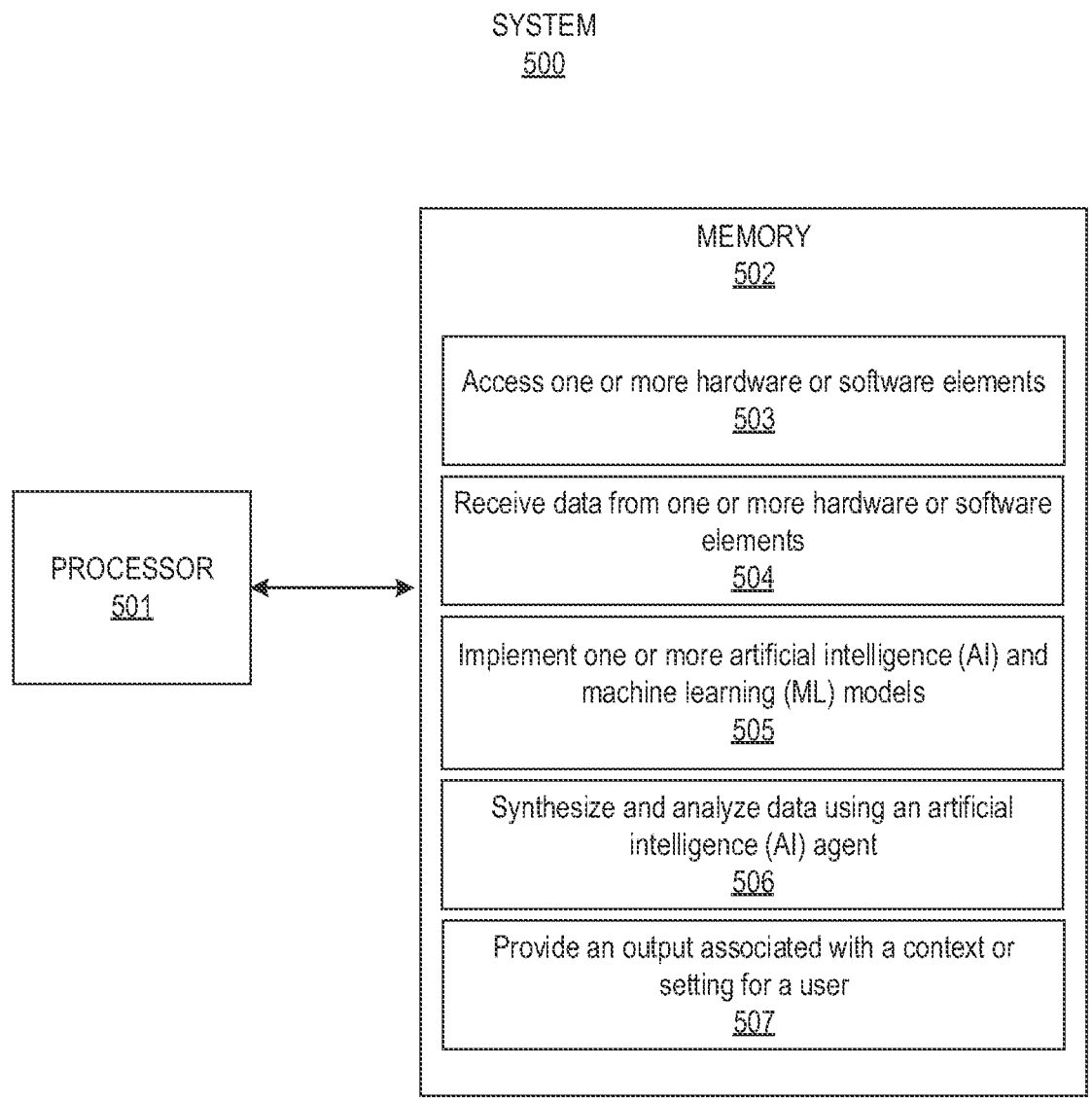

Reference is now made to FIGS. 5A-5B. FIG. 5A illustrates a block diagram of a system environment, including a system, that may be implemented to provide supplementing user perception and experience via augmented reality (AR), artificial intelligence (AI), and machine-learning (ML) techniques utilizing an artificial intelligence (AI) agent, according to an example. FIG. 5B illustrates a block diagram of the system that may be implemented to provide supplementing user perception and experience via augmented reality (AR), artificial intelligence (AI), and machine-learning (ML) techniques utilizing an artificial intelligence (AI) agent, according to an example.

As will be described in the examples below, one or more of system 500, external system 520, user devices 530A-530E and system environment 5000 shown in FIGS. 5A-5B may be operated by a service provider to provide supplementing of user perception and experience via augmented reality (AR), artificial intelligence (AI), and machine-learning (ML) techniques. It should be appreciated that one or more of the system 500, the external system 520, the user devices 530A-530E and the system environment 5000 depicted in FIGS. 5A-5B may be provided as examples. Thus, one or more of the system 500, the external system 520 the user devices 530A-530E and the system environment 5000 may or may not include additional features and some of the features described herein may be removed and/or modified without departing from the scopes of the system 500, the external system 520, the user devices 530A-530E and the system environment 5000 outlined herein. Moreover, in some examples, the system 500, the external system 520, and/or the user devices 530A-530E may be or associated with a social networking system, a content sharing network, an advertisement system, an online system, and/or any other system that facilitates any variety of digital content in personal, social, commercial, financial, and/or enterprise environments.

While the servers, systems, subsystems, and/or other computing devices shown in FIGS. 5A-5B may be shown as single components or elements, it should be appreciated that one of ordinary skill in the art would recognize that these single components or elements may represent multiple components or elements, and that these components or elements may be connected via one or more networks. Also, middleware (not shown) may be included with any of the elements or components described herein. The middleware may include software hosted by one or more servers. Furthermore, it should be appreciated that some of the middleware or servers may or may not be needed to achieve functionality. Other types of servers, middleware, systems, platforms, and applications not shown may also be provided at the front-end or back-end to facilitate the features and functionalities of the system 500, the external system 520, the user devices 530A-530E, or the system environment 5000.

It should also be appreciated that the systems and methods described herein may be particularly suited for digital content, but are also applicable to a host of other distributed content or media. These may include, for example, content or media associated with data management platforms, search or recommendation engines, social media, and/or data communications involving communication of potentially personal, private, or sensitive data or information. These and other benefits will be apparent in the descriptions provided herein.

In some examples, the external system 520 may include any number of servers, hosts, systems, and/or databases that store data to be accessed by the system 500, the user devices 530A-530E, and/or other network elements (not shown) in the system environment 5000. In addition, in some examples, the servers, hosts, systems, and/or databases of the external system 520 may include one or more storage mediums storing any data. In some examples, and as will be discussed further below, the external system 520 may be utilized to store any information that may relate to generation and delivery of content (e.g., content platform information, etc.).

In some examples, and as will be described in further detail below, the user devices 530A-530E may be utilized to, among other things, provide supplementing of user perception and experience via augmented reality (AR), artificial intelligence (AI), and machine-learning (ML) techniques. In some examples and as will be described in further detail, the user devices 530A-530E may be electronic or computing devices configured to transmit and/or receive data. In this regard, each of the user devices 530A-530E may be any device having computer-oriented functionality, such as a television, a radio, a smartphone, a tablet, a laptop, a watch, a desktop, a server, or other computing or entertainment device or appliance.

In some examples, the user devices 530A-530E may be mobile devices that are communicatively coupled to the network 540 and satellite 550, and enabled to interact with various network elements over the network 540 and the satellite 550. As discussed further below, examples of these devices may include, among other things, smart watches, smart wrist bands, and any other smart wearable devices. In some examples, the user devices 530A-530E may execute one or more applications that may allow a user of the user devices 530A-530E to interact with various network elements on the network 540. Additionally, the user devices 530A-530E may execute a browser or application to enable interaction between the user devices 530A-530E and the system 500 via the network 540 and/or the satellite 550. In some examples, and as will described further below, a client (e.g., a user) may utilize the user devices 530A-530E to access a browser and/or an application interface for providing supplementing of user perception and experience via augmented reality (AR), artificial intelligence (AI), and machine-learning (ML) techniques.

Moreover, in some examples and as will also be discussed further below, the user devices 530A-530E may be utilized by a user viewing content (e.g., advertisements) distributed by a service provider. In addition, in some examples, information relating to the user may be stored and transmitted by the user devices 530A to other devices, such as the external system 520.

The system environment 5000 may also include the network 540. In operation, one or more of the system 500, the external system 520 and the user devices 530A-530E may communicate with one or more of the other devices via the network 540. The network 540 may be a local area network (LAN), a wide area network (WAN), the Internet, a cellular network, a cable network, a satellite network, or other network that facilitates communication between, the system 500, the external system 520, the user devices 530A-530E and/or any other system, component, or device connected to the network 540. The network 540 may further include one, or any number, of the exemplary types of networks mentioned above operating as a stand-alone network or in cooperation with each other. For example, the network 540 may utilize one or more protocols of one or more clients or servers to which they are communicatively coupled. The network 540 may facilitate transmission of data according to a transmission protocol of any of the devices and/or systems in the network 540. Although the network 540 is depicted as a single network in the system environment 5000 of FIG. 5A, it should be appreciated that, in some examples, the network 540 may include a plurality of interconnected networks as well.

It should be appreciated that in some examples, and as will be discussed further below, the system 500 may be configured to supplement user perception and experience via augmented reality (AR), artificial intelligence (AI), and machine-learning (ML) techniques. Details of the system 500 and its operation within the system environment 5000 will be described in more detail below.

As shown in FIGS. 5A-5B, the system 500 may include processor 501 and the memory 502. In some examples, the processor 501 may be configured to execute the machine-readable instructions stored in the memory 502. It should be appreciated that the processor 501 may be a semiconductor-based microprocessor, a central processing unit (CPU), an application specific integrated circuit (ASIC), a field-programmable gate array (FPGA), and/or other suitable hardware device.

In some examples, the memory 502 may have stored thereon machine-readable instructions (which may also be termed computer-readable instructions) that the processor 501 may execute. The memory 502 may be an electronic, magnetic, optical, or other physical storage device that contains or stores executable instructions. The memory 502 may be, for example, random access memory (RAM), an Electrically Erasable Programmable Read-Only Memory (EEPROM), a storage device, an optical disc, or the like. The memory 502, which may also be referred to as a computer-readable storage medium, may be a non-transitory machine-readable storage medium, where the term "non-transitory" does not encompass transitory propagating signals. It should be appreciated that the memory 502 depicted in FIGS. 5A-5B may be provided as an example. Thus, the memory 502 may or may not include additional features, and some of the features described herein may be removed and/or modified without departing from the scope of the memory 502 outlined herein.

It should be appreciated that, and as described further below, the processing performed via the instructions on the memory 502 may or may not be performed, in part or in total, with the aid of other information and data, such as information and data provided by the external system 520 and/or the user devices 530A-530E. Moreover, and as described further below, it should be appreciated that the processing performed via the instructions on the memory 502 may or may not be performed, in part or in total, with the aid of or in addition to processing provided by other devices, including for example, the external system 520 and/or the user devices 530A-530E.

In some examples, the memory 502 may store instructions, which when executed by the processor 501, may cause the processor to: access one or more hardware or software elements, receive data from one or more hardware elements, and implement one or more artificial intelligence (AI) and machine learning (ML) models. In addition, the instructions, when executed by the processor 501, may cause the processor to synthesize and analyze data using an artificial intelligence (AI) agent and provide an output associated with a context or setting for a user.

In some examples, and as discussed further below, the instructions 503-507 on the memory 502 may be executed alone or in combination by the processor 501 to provide supplementing of user perception and experience via augmented reality (AR), artificial intelligence (AI), and machine-learning (ML) techniques. In some examples, the instructions 503-507 may be implemented in association with a platform (e.g., a content platform configured to provide content for users), while in other examples, the instructions 503-507 may be implemented as part of a stand-alone application.

In some examples, the instructions 503 may access one or more hardware or software elements. In particular, in some examples, the instructions 503 may access the one or more hardware or software elements to supplement perception and experience for a user via augmented reality (AR), artificial intelligence (AI), and machine-learning (ML) techniques.

As discussed above, in some examples, the instructions 503 may access any device with computer functionality configured to provide data. Examples of the one or more hardware devices (including associated software elements) are illustrated in FIG. 5A. In some examples, the system environment 5000 may include a user device 530A that may be augmented reality (AR) eyeglasses worn by a user. In some instances, the augmented reality (AR) eyeglasses may provide a (visual) representation of a user's surroundings while also providing digital overlays. In addition, in some examples, the system environment 5000 may include a user device 530B that may be augmented reality (AR) gloves and a user device 530C that may be an augmented reality (AR) cane. In some instances, such as instances where the user may be visually impaired, the user may utilize the augmented reality (AR) gloves and the augmented reality (AR) cane to gather additional information about their surroundings. For example, the user may utilize the augmented reality (AR) gloves to gather and receive haptic (e.g., touch) information related to their surroundings, and may utilize the augmented reality (AR) cane to gather and receive haptic information, gather and receive depth sensing information, and receive navigation information as well. It may be appreciated that the instructions 503 may access the one or more hardware or software elements across multiple users being in a same or different location or setting over time.

In addition, in some examples, the system environment 5000 may include a user device 530D that may be an augmented reality (AR) headset and a user device 530E that may be a mobile (communications) device, such as a mobile phone. In some examples, similar to the augmented reality (AR) eyeglasses discussed above, the augmented reality (AR) headset may gather and present real-world visual information and may provide overlaid digital information as well. So, in one example, a user that utilizes the augmented reality (AR) headset and the mobile phone may be a museum-goer on a guided tour of a museum.

In some examples, the instructions 504 may receive data from one or more hardware or software elements (e.g., as provided via the instructions 503). Examples of these hardware and software elements may include, among other things, wearable devices such as smartwatches, smart wrist bands, and smartphones. In particular, in some examples, the instructions 504 may receive the data from the one or more hardware or software elements in association with a location, a context, and/or a setting. So, with regard to the examples described above, the instructions 504 may receive data from one or more of the augmented reality (AR) eyeglasses, the augmented reality (AR) gloves, the augmented reality (AR) cane), the augmented reality (AR) headset, and the mobile device illustrated in FIG. 5A. It may be appreciated that this data may be received continuously and in real-time, or not, and may be utilized to provide supplementing of user perception and experience continuously and in real-time, or not.

It may be appreciated that the instructions 504 may be configured to receive data of any type. Various examples are described in the non-exhaustive listing provided below. For example, in some instances, the instructions 504 may receive image (e.g., visual) information. So, in the example illustrated in FIG. 5A, the instructions 504 may receive image data from a camera located on a user's mobile phone. In some examples, the image information may be received, among other things, in image and video formats. The instructions 504 may also receive audio information. In the example illustrated in FIG. 5A, the instructions 504 may receive the audio information via a microphone located on a user's mobile phone.

In some examples, the instructions 504 may receive sensor data. As used herein, "sensor data" may include any information originating from a sensor that may be associated with a location to be determined. It may be appreciated that to receive the sensor data, the instructions 504 may also be configured to operate one or more sensors. So, in some examples and as illustrated in FIG. 5A, the instructions 504 may receive sensor data from sensors located on the mobile phone. In some examples, the instructions 504 may receive, among other things, inertial measurement unit (IMU) data and electromyography (EMG) data. As discussed above, this data may be collected from a variety of user devices, including but not limited to wearable devices such as smartwatches, smart wrist bands, and smartphones. In some examples, this information may be provided by an accelerometer, a gyroscope, and a magnetometer located on a user device (e.g., a smartphone). Examples of other sensors that may be implemented by the user device may include a pressure sensor, a piezometer, and a photodetector.

In addition, the instructions 504 may receive depth sensing information. In the example illustrated in FIG. 5A, the instructions 504 may receive depth-related information from the augmented reality (AR) cane operated by a user. Also, the instructions 504 may receive haptic and tactile information. In particular, in the example illustrated in FIG. 5A, the instructions 504 may receive the haptic and tactile information from one or more of the augmented reality (AR) gloves and the augmented reality (AR) cane. Furthermore, the instructions 504 may receive gesture-related information. So, in the example illustrated in FIG. 5A, the instructions

504 may receive the gesture-related information via the augmented reality (AR) gloves worn by a user.

In some examples, the instructions 505 may access and implement one or more artificial intelligence (AI) and machine learning (ML) models. In particular, in some examples, the instructions 505 may implement the one or more artificial intelligence (AI) and machine learning (ML) models with respect to incoming data (e.g., such as that provided via instructions 503-504) to provide supplementing of user perception and experience. Examples of these artificial intelligence (AI) and machine learning (ML) tools may include large language and multi-modal transformer models. In some examples, these artificial intelligence (AI) and machine learning (ML) tools may be directed to, among other things, determining relationships between objects, context, location, and settings, in addition to simply providing conversational feedback to user.

It should be appreciated that to provide supplementing of user perception and experience via augmented reality (AR), artificial intelligence (AI), and machine-learning (ML) techniques, instructions 503-507 may utilize various artificial intelligence (AI) based machine learning (ML) tools. For instance, these artificial intelligence (AI) based machine learning (ML) tools may be used to generate models that may include a neural network, a generative adversarial network (GAN), a tree-based model, a Bayesian network, a support vector, clustering, a kernel method, a spline, a knowledge graph, or an ensemble of one or more of these and other techniques. It should also be appreciated that the system 500 may provide other types of machine learning (ML) approaches, such as reinforcement learning, feature learning, anomaly detection, etc.

In some examples, the one or more artificial intelligence (AI) and machine learning (ML) models implemented via the instructions 505 may be applicable to any context and directed to any purpose. Various examples are provided in a non-exhaustive list below. For example, the instructions 505 may implement one or more artificial intelligence (AI) and machine learning (ML) models directed to object recognition and understanding of relationships between objects in a location, context, or setting. In some instances, this may include contextual determination and understanding (e.g., importance-based, hierarchical understanding about a location, context, or setting), determining of a frame of reference, determining of a contextual point-of-view or perspective of a location, context, or setting, and determining which are objects of importance in a location, context, and/or setting. In some examples, the one or more artificial intelligence (AI) and machine learning (ML) models implemented via the instructions 505 may determine relationships between objects in the at least one of the location, context, or setting.

Also, in some examples, to achieve this, the one or more artificial intelligence (AI) and machine learning (ML) models implemented via the instructions 505 may take the above information and generate an associated digital map. In addition, in some examples, the instructions 505 may implement one or more artificial intelligence (AI) and machine learning (ML) models directed to audio and/or visual questioning and answering related to a location, context, and/or setting. Also, in some examples, the instructions 505 may implement one or more artificial intelligence (AI) and machine learning (ML) models directed to large language models (LLM) to provide conversation associated with a location, context, and/or setting.

In some examples, the instructions 506 may implement an artificial intelligence (AI) agent. As used herein, an "agent" may include any computer software, program, application or set of computer-implemented instructions that may provide supplementing of user perception and experience. In particular, in some examples, the instructions 506 may implement the artificial intelligence (AI) agent to, among other things, synthesize and analyze associated with a context, location, and/or setting. So, in some examples, the artificial intelligence (AI) agent implemented via the instructions 506 may utilize information associated with a context, location, and/or setting to provide an output directed to a user's perception and experience of the context, location, and/or setting. In some instances, the artificial intelligence (AI) agent may operate as the "brains" of the systems and methods described herein. It may be appreciated that artificial intelligence (AI) agent implemented via the instructions 506 may be configured to implement one or more artificial intelligence (AI) and machine learning (ML) models, such as those implemented via the instructions 505. In some examples, the instructions 506 may apply an artificial intelligence (AI) agent to analyze the relationships determined by at least one artificial intelligence (AI) model and at least one machine learning (ML) model and generate a three-dimensional (3D) mapping of the at least one of a location, context, or setting.

It may be appreciated that, in some examples, an analysis provided via an artificial intelligence (AI) agent implemented via the instructions 506 may be personalized to a user. For example, the analysis provided may be personalized according to, and among other things, the user's past interactions, history, and preferences.

As will be discussed in greater detail below, in some examples, an artificial intelligence (AI) agent as implemented via the instructions 506 may be configured to attempt to generate a "complete" (e.g., informationally complete) rendition of a setting, context, or location that may aid a user with any and all necessary information to navigate the setting, context, and/or location.

In some examples, the instructions 506 may implement an artificial intelligence (AI) agent to analyze various information (e.g., the information provided via the instructions 503-505) and to determine a location, context, and/or setting. In some examples, the location, context, and/or setting may be determined with respect to one or more users.

In some examples, the instructions 506 may implement an artificial intelligence (AI) agent to provide a localization and mapping analysis associated with a location, context, and/or setting. As will be discussed in further detail, the instructions 506 may utilize any information available via the instructions 503-505 to conduct a localization and mapping analysis for a location. As used herein, "localization" may include any activity or information associated with determining a location, and "mapping" may include any activity or information associated with determining an aspect or characteristic associated with a location.

In some examples, the instructions 506 may implement an artificial intelligence (AI) agent to gather information (e.g., captured images) from a plurality of sources, and may utilize this information to build a database of mappings. In some examples, the database of mappings may include a mapping associated with a particular location, context, and/or setting. An example of the plurality of sources may be a plurality of users of a social application using cameras on their mobile phones to capture images.

In some examples, implement an artificial intelligence (AI) agent to conduct a localization and mapping analysis, the instructions 506 may provide a simultaneous localization and mapping (SLAM) analysis. In some examples, in conducting the simultaneous localization and mapping (SLAM) analysis, the instructions 506 may utilize (among other things) one or more images associated with a location to construct a map of a location. In addition, in some examples, upon completing a map of a location (e.g., "closing of the loop"), the instructions 506 may utilize the constructed map to associate information (e.g., image information) received from a location (e.g., to be determined) to information (e.g., image information) for the mapped location. In addition, in some examples, to associate the information received with information of a previously mapped location, the instructions 506 may also utilize global navigation satellite system (GNSS) data, such as global positioning service (GPS) data.

In some examples, the instructions 506 may implement an artificial intelligence (AI) agent to provide analysis of image information. As used herein, "analysis of image information" may include any processing or analysis of any image data related to determining a location. In some examples, analysis of image information by the instructions 506 may include analysis of text characters included in an image (e.g., an image of a sign or a billboard). In some examples, a captured image received via the instructions 506 may be analyzed to determine the text, and the determined text may be utilized to determine a location.

In some examples, to provide image analysis, the instructions 506 may implement an artificial intelligence (AI) agent to detect one or more features associated with an image. Examples of these features may include, but are not limited to, landmarks, structures (e.g., buildings) signs (e.g., road signs, commercial signs, etc.), geographic landmarks (e.g., mountains).

In particular, in some examples, the instructions 506 may implement an artificial intelligence (AI) agent to generate a three-dimensional (3D) mapping (e.g., a model) of a context, location, and/or setting. In some examples, the context, location, and/or setting may be associated with one or more users. So, in one examples, the instructions 506 may implement the artificial intelligence (AI) agent to generate a three-dimensional (3D) mapping of a museum, and as will be discussed further below, may utilize this three-dimensional (3D) mapping of the museum to supplement a user's perception and experience.

In some examples, the instructions 507 may provide an output associated with supplementing of user perception and experience via augmented reality (AR), artificial intelligence (AI), and machine-learning (ML) techniques. Also, in some examples, to supplement user perception and experience, the instructions 507 may implement an artificial intelligence (AI) agent, as described with respect to the instructions 506. It may be appreciated that, in some examples, the output provided via the instructions 507 may be directed one or more users, and that in some examples, the output may be with respect to one or more contexts, locations, and/or settings.

As discussed above with respect to the instructions 506, in some examples, an artificial intelligence (AI) agent implemented via the instructions 507 may continuously analyze information associated with a context, location, and/or setting (e.g., as provided via the instructions 503-506), and may "feed" this (e.g., continuously received) information to one or more artificial intelligence (AI) and machine learning (ML) models to generate an output associated with supplementing a user's perception and experience. One example of such an artificial intelligence (AI) model may provide object detection, wherein the instructions 507 may implement the artificial intelligence (AI) agent to provide an audio (e.g., voice) rendition of each of salient or significant objects located in the context, location, and/or setting. In another example, the instructions 507 may implement the artificial intelligence (AI) agent to utilize a large language model (LLM) algorithm to enable a natural, conversational interface that may "guide" a user through an environment in real-time.

It may be appreciated that, in some examples, the artificial intelligence (AI) agent implemented via the instructions 507 may be effectively configured to be "hyper-aware" of a context, setting, or location, and may utilize this information to generate and deliver (e.g., output) an enhanced understanding and/or experience of the context, setting, and/or location. In addition, the artificial intelligence (AI) agent implemented via the instructions may also be able to deliver (e.g., output) a supplemented user perception and experience with respect to the context, setting, and/or location via implementation of various output modalities (e.g., audio, video, tactile, etc.) as well. So, in one example involving a user in a completely new setting, the instructions 507 may utilize a name of a book (e.g., determined via an image analysis implemented via the instructions 506), and may include the name of the book when answering a question from a user. In another example involving a visually impaired using crossing a street, the instructions 507 may implement the artificial intelligence (AI) agent to identify and/or predict relevant aspects of the setting. Examples may include a distance to be crossed reach the other side, whether a walker's street light may be on or off, and how many cars may be approaching and how fast. Examples of aspects that may be predicted may include anticipatorily translating a relevant distance to a corresponding sound or volume, or providing a displacement of haptic feedback (e.g., feeling a distance or drop from a step before actually stepping on it).

In addition, the instructions 507 may implement the artificial intelligence (AI) agent to provide one or more responses (e.g., outputs) that may supplement the visually impaired user's experience as well. For example, in some instances, the artificial intelligence agent implemented by the instructions 507 may determine that a particular car may be a risk to the user, and provide indicating response. In this example, this indicating response may constitute a vibration on a user device or may be a push in a reverse direction generated by a user device (e.g., an augmented reality (AR) cane) used by the user. In another example, the indicating response may be an alarm (e.g., audio) sounded through the microphone of a user device (e.g., a mobile phone).

It may be appreciated that, in some examples, an output provided via an artificial intelligence (AI) agent implemented via the instructions 507 may personalized to a user. For example, the output provided may be personalized according to, and among other things, the user's past interactions, history, and preferences.

Figure 5C:
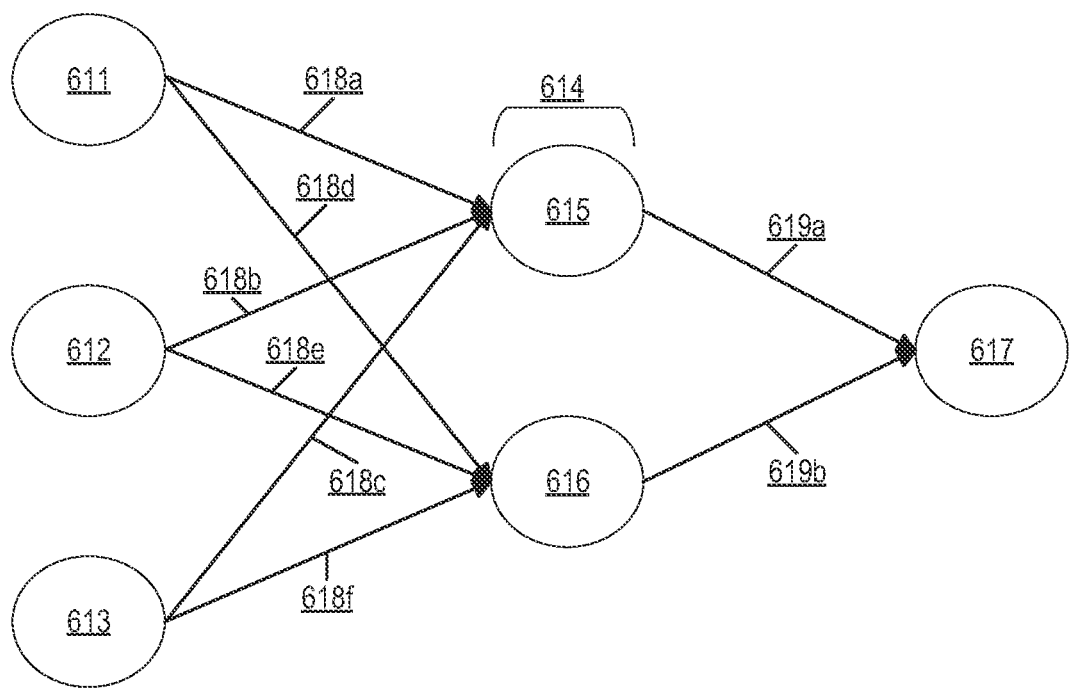
FIG. 5C illustrates a diagram of an implementation structure for an artificial intelligence (AI) agent implementing deep learning, according to an example.

FIG. 5C illustrates a diagram of an implementation structure for artificial intelligence (AI) agent implementing artificial intelligence (AI) and deep learning, according to an example. In some examples, implementation of artificial intelligence (AI) agent 610 (hereinafter also referred to as "network 610") may include organizing a structure of the artificial intelligence (AI) agent 610 and "training" the artificial intelligence (AI) agent 610. Although an example of a neural network is provided here, it should be appreciated that (as discussed above) other computational methods may be utilized as well.

In some examples, organizing the structure of the artificial intelligence (AI) agent 610 may include network elements including one or more inputs, one or more nodes and an output. In some examples, a structure of the artificial intelligence (AI) agent 610 may be defined to include a plurality of inputs 611, 612, 613, a layer 614 with a plurality of nodes 615, 616, and an output 617.

In addition, in some examples, organizing the structure of the artificial intelligence (AI) agent 610 may include assigning one or more weights associated with the plurality of nodes 615, 616. In some examples, the artificial intelligence (AI) agent 610 may implement a first group of weights 618, including a first weight 618*a* between the input 611 and the node 615, a second weight 618*b* between the input 612 and the node 615, a third weight 618*c* between the input 613 and the node 615. In addition, the artificial intelligence (AI) agent 610 may implement a fourth weight 618*d* between the input 611 and the node 616, a fifth weight 618*e* between the input 612 and the node 616, and a sixth weight 618*f* between the input 613 and the node 616 as well. In addition, a second group of weights 619, including the first weight 619*a* between the node 615 and the output 617 and the second weight 619*b* between the node 616 and the output 617 may be implemented as well.

In some examples, "training" the artificial intelligence (AI) agent 610 may include utilization of one or more "training datasets" $\{(x_i, y_i)\}$, where i=1 ... N for an N number of data pairs. In particular, as will be discussed below, the one or more training datasets $\{(x_i, y_i)\}$ may be used to adjust weight values associated with the artificial intelligence (AI) agent 610.

Training of the artificial intelligence (AI) agent 610 may also include, in some examples, may also include implementation of forward propagation and backpropagation. Implementation of forward propagation and backpropagation may include enabling the artificial intelligence (AI) agent 610 to adjust aspects, such as weight values associated with nodes, by looking to past iterations and outputs. In some examples, a forward "sweep" through the artificial intelligence (AI) agent 610 to compute an output for each layer. At this point, in some examples, a difference (e.g., a "loss") between an output of a final layer and a desired output may be "back-propagated" through previous layers by adjusting weight values associated with the nodes in order to minimize a difference between an estimated output from the artificial intelligence (AI) agent 610 (e.g., an "estimated output") and an output the network 610 was meant to produce (e.g., a "ground truth"). In some examples, training of the artificial intelligence (AI) agent 610 may require numerous iterations, as the weights may be continually adjusted to minimize a difference between estimated output and an output the artificial intelligence (AI) agent 610 was meant to produce.

In some examples, once weights for the artificial intelligence (AI) agent 610 may be learned, the artificial intelligence (AI) agent 610 may be used make a prediction or "inference". In some examples, the artificial intelligence (AI) agent 610 may make an inference for a data instance, x\*, which may not have been included in the training datasets $\{(x_i, y_i)\}$, to provide an output value y\* (e.g., an inference) associated with the data instance x\*. Furthermore, in some examples, a prediction loss indicating a predictive quality (e.g., accuracy) of the artificial intelligence (AI) agent 610 may be ascertained by determining a "loss" representing a difference between the estimated output value y\* and an associated ground truth value.

Figure 6:
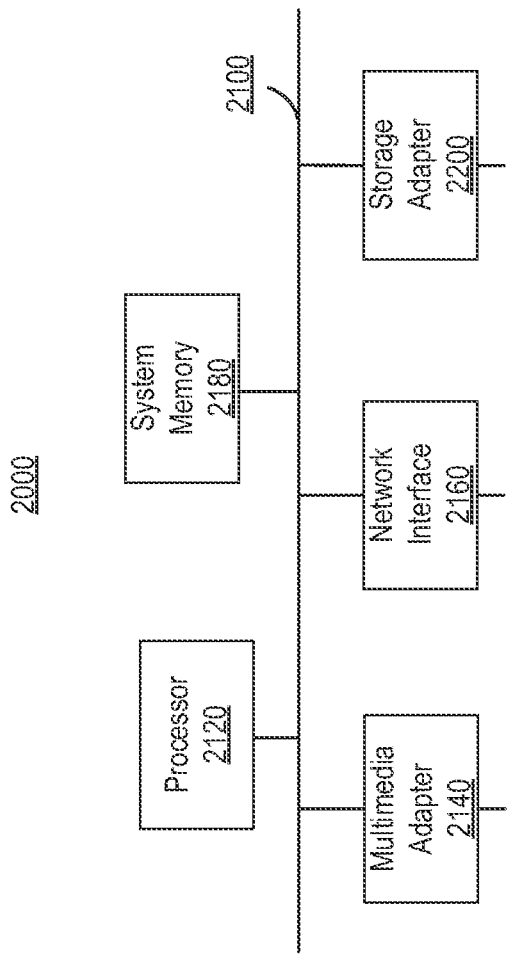
FIG. 6 illustrates a block diagram of a computer system to provide supplementing user perception and experience via augmented reality (AR), artificial intelligence (AI), and machine-learning (ML) techniques utilizing an artificial intelligence (AI) agent, according to an example.

FIG. 6 illustrates a block diagram of a computer system to provide supplementing user perception and experience via augmented reality (AR), artificial intelligence (AI), and machine-learning (ML) techniques utilizing an artificial intelligence (AI) agent, according to an example. In some examples, the system 2000 may be associated the system 500 to perform the functions and features described herein. The system 2000 may include, among other things, an interconnect 2100, a processor 2120, a multimedia adapter 2140, a network interface 2160, a system memory 2180, and a storage adapter 2200.

The interconnect 2100 may interconnect various subsystems, elements, and/or components of the external system 520. As shown, the interconnect 2100 may be an abstraction that may represent any one or more separate physical buses, point-to-point connections, or both, connected by appropriate bridges, adapters, or controllers. In some examples, the interconnect 2100 may include a system bus, a peripheral component interconnect (PCI) bus or PCI-Express bus, a HyperTransport or industry standard architecture (ISA)) bus, a small computer system interface (SCSI) bus, a universal serial bus (USB), IIC (I2C) bus, or an Institute of Electrical and Electronics Engineers (IEEE) standard 1394 bus, or "firewire," or other similar interconnection element.

In some examples, the interconnect 2100 may allow data communication between the processor 2120 and system memory 2180, which may include read-only memory (ROM) or flash memory (neither shown), and random access memory (RAM) (not shown). It should be appreciated that the RAM may be the main memory into which an operating system and various application programs may be loaded. The ROM or flash memory may contain, among other code, the Basic Input-Output system (BIOS) which controls basic hardware operation such as the interaction with one or more peripheral components.

The processor 2120 may be the central processing unit (CPU) of the computing device and may control overall operation of the computing device. In some examples, the processor 2120 may accomplish this by executing software or firmware stored in system memory 2180 or other data via the storage adapter 2200. The processor 2120 may be, or may include, one or more programmable general-purpose or special-purpose microprocessors, digital signal processors (DSPs), programmable controllers, application specific integrated circuits (ASICs), programmable logic device (PLDs), trust platform modules (TPMs), field-programmable gate arrays (FPGAs), other processing circuits, or a combination of these and other devices.

The multimedia adapter 2140 may connect to various multimedia elements or peripherals. These may include devices associated with visual (e.g., video card or display), audio (e.g., sound card or speakers), and/or various input/output interfaces (e.g., mouse, keyboard, touchscreen).

The network interface 2160 may provide the computing device with an ability to communicate with a variety of remote devices over a network (e.g., network 540 of FIG. 5A) and may include, for example, an Ethernet adapter, a Fibre Channel adapter, and/or other wired- or wireless-enabled adapter. The network interface 2160 may provide a direct or indirect connection from one network element to another, and facilitate communication and between various network elements.

The storage adapter 2200 may connect to a standard computer-readable medium for storage and/or retrieval of information, such as a fixed disk drive (internal or external).

Many other devices, components, elements, or subsystems (not shown) may be connected in a similar manner to the interconnect 2100 or via a network (e.g., network 540 of FIG. 5A). Conversely, all of the devices shown in FIG. 6 need not be present to practice the present disclosure. The devices and subsystems can be interconnected in different ways from that shown in FIG. 6. The operating system provided on system 500 may be MS-DOS, MS-WINDOWS, OS/2, OS X, IOS, ANDROID, UNIX, Linux, or another operating system.

Figure 7:
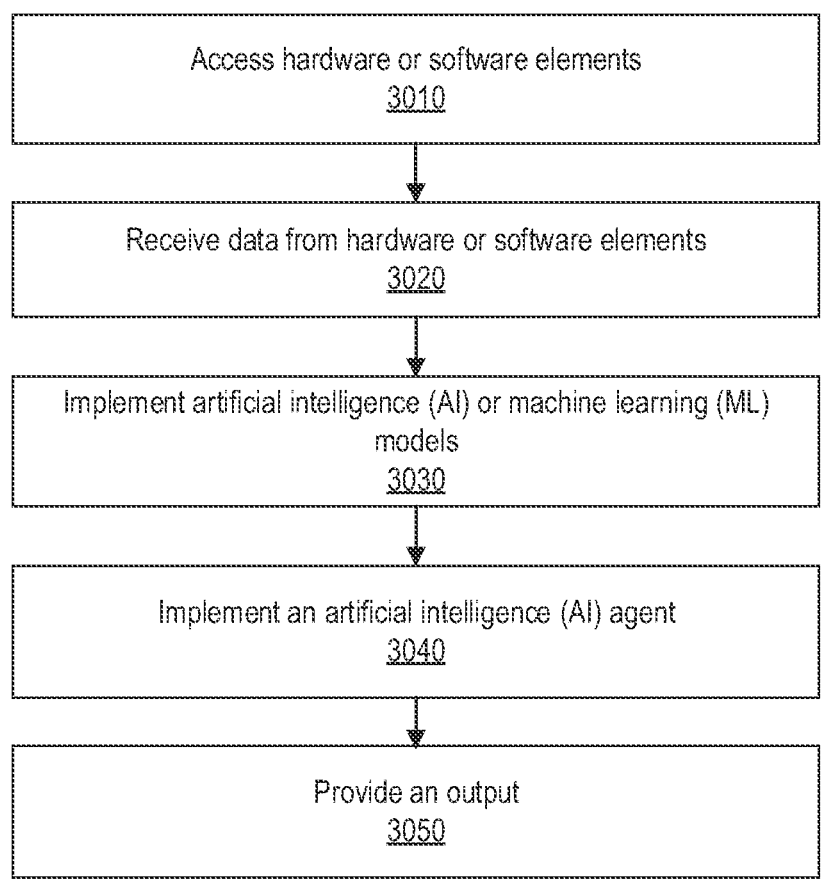
FIG. 7 illustrates a method for supplementing user perception and experience via augmented reality (AR), artificial intelligence (AI), and machine-learning (ML) techniques utilizing an artificial intelligence (AI) agent, according to an example.

FIG. 7 illustrates a method for supplementing user perception and experience via augmented reality (AR), artificial intelligence (AI), and machine-learning (ML) techniques utilizing an artificial intelligence (AI) agent, according to an example. The method 3000 is provided by way of example, as there may be a variety of ways to carry out the method described herein. Each block shown in FIG. 7 may further represent one or more processes, methods, or subroutines, and one or more of the blocks may include machine-readable instructions stored on a non-transitory computer-readable medium and executed by a processor or other type of processing circuit to perform one or more operations described herein.

Although the method 3000 is primarily described as being performed by system 500 as shown in FIGS. 5A-5B, the method 3000 may be executed or otherwise performed by other systems, or a combination of systems. It should be appreciated that, in some examples, to provide generating and publishing of composite content items based on original content items, the method 3000 may be configured to incorporate artificial intelligence (AI) or deep learning techniques, as described above. It should also be appreciated that, in some examples, the method 3000 may be implemented in conjunction with a content platform (e.g., a social media platform) to generate and deliver content.

Reference is now made with respect to FIG. 7. At 3010, in some examples, the processor 501 may access one or more hardware or software elements. In particular, in some examples, the processor 501 may access the one or more hardware or software elements to supplement perception and experience of a user via augmented reality (AR), artificial intelligence (AI), and machine-learning (ML) techniques. As discussed above, in some examples, the processor 501 may access any device with computer functionality that may be able to provide data. Examples of the one or more hardware devices (including associated software elements) are illustrated in FIG. 5A. It may be appreciated that the processor 501 may access the one or more hardware or software elements across multiple users being in a same or different location or setting over time.

At 3020, in some examples, the processor 501 may receive data from one or more hardware or software elements (e.g., as provided via the processor 501). In particular, in some examples, the processor 501 may receive the data from the one or more hardware or software elements in association with a location, a context, and/or a setting. So, with regard to the examples described above, the processor 501 may receive data from one or more of the augmented reality (AR) eyeglasses, the augmented reality (AR) gloves, the augmented reality (AR) cane), the augmented reality (AR) headset, and the mobile device illustrated in FIG. 5A. It may be appreciated that this data may be received continuously and in real-time, or not, and may be utilized to provide supplementing of user perception and experience continuously and in real-time, or not.

It may be appreciated that the processor 501 may be configured to receive data of any type. Various examples are described in the non-exhaustive listing provided below. In some examples, the processor 501 may receive image (e.g., visual) information. So, in the example illustrated in FIG. 5A, the processor 501 may receive image information from a camera located on a user's mobile phone. It may be appreciated that the image information may be received, among other things, in image and video forms. The processor 501 may also receive audio information. In the example illustrated in FIG. 5A, the processor 501 may receive the audio information via a microphone located on a user's mobile phone.

At 3030, in some examples, the processor 501 may implement one or more artificial intelligence (AI) and machine learning (ML) models. In particular, in some examples, the processor 501 may implement the one or more artificial intelligence (AI) and machine learning (ML) models with respect to incoming data to provide supplementing of user perception and experience.

It should be appreciated that to provide supplementing of user perception and experience via augmented reality (AR), artificial intelligence (AI), and machine-learning (ML) techniques, the processor 501 may utilize various artificial intelligence (AI) based machine learning (ML) tools. In some examples, the one or more artificial intelligence (AI) and machine learning (ML) models implemented via the processor 501 may be applicable to any context and directed to any purpose. In addition, in some examples, the processor 501 may implement one or more artificial intelligence (AI) and machine learning (ML) models directed to audio and/or visual questioning and answering related to a location, context, or setting.

At 3040, in some examples, the processor 501 may implement an artificial intelligence (AI) agent. In particular, in some examples, the processor 501 may implement the artificial intelligence (AI) agent to, among other things, synthesize and analyze associated with a context, location, and/or setting. It may be appreciated that, in some examples, an analysis provided via an artificial intelligence (AI) agent implemented via the processor 501 may personalized to a user. In some examples, an artificial intelligence (AI) agent as implemented via the processor 501 may be configured to generate a "complete" (e.g., informationally complete) rendition of a setting, context, or location that may provide any and all necessarily information to a user to navigate the setting, context, or location. In some examples, the processor 501 may implement an artificial intelligence (AI) agent to provide a localization and mapping analysis. Also, in some examples, the processor 501 may implement an artificial intelligence (AI) agent to gather information (e.g., captured images) from a plurality of sources, and may utilize this information to build a database of mappings. In some examples, the processor 501 may implement an artificial intelligence (AI) agent to provide analysis of image information. In some examples, to provide image analysis, the processor 501 may implement an artificial intelligence (AI) agent to detect one or more features associated with an image. In particular, in some examples, the processor 501 may implement an artificial intelligence (AI) agent to generate a three-dimensional (3D) mapping (e.g., model) of a context, location, and/or setting.

At 3050, in some examples, the processor 501 may provide an output associated with supplementing of user perception and experience via augmented reality (AR), artificial intelligence (AI), and machine-learning (ML) techniques. The processor 501, in some examples, an artificial intelligence (AI) agent implemented via the processor 501 may continuously analyze information associated with a context, location, and/or setting, and may "feed" this (e.g., continuously received) information to one or more artificial intelligence (AI) and machine learning (ML) models to generate an output associated with supplementing a user's perception and experience.

It may be appreciated that, in some examples, the artificial intelligence (AI) agent implemented via the processor 501 may be effectively configured to be "hyper-aware" of a context, setting, or location, and may utilize this information to generate and delivery an enhanced understanding of the context, setting, or location. In addition, the artificial intelligence (AI) agent may also be able to deliver a supplemented user perception and experience with respect to the context, setting, or location via implementation of various output modalities (e.g., audio, video, tactile, etc.) as well. In addition, the processor 501 may implement the artificial intelligence (AI) agent to provide one or more outputs that may supplement the visually impaired user's experience as well. It may be appreciated that, in some examples, an output provided via an artificial intelligence (AI) agent implemented via the processor 501 may personalized to a user.

Although the methods and systems as described herein may be directed mainly to digital content, such as videos or interactive media, it should be appreciated that the methods and systems as described herein may be used for other types of content or scenarios as well. Other applications or uses of the methods and systems as described herein may also include social networking, marketing, content-based recommendation engines, and/or other types of knowledge or data-driven systems.

It should be noted that the functionality described herein may be subject to one or more privacy policies, described below, enforced by the system 500, the external system 520, and the user devices 530A-530E that may bar use of images for concept detection, recommendation, generation, and analysis.

In particular examples, one or more objects of a computing system may be associated with one or more privacy settings. The one or more objects may be stored on or otherwise associated with any suitable computing system or application, such as, for example, the system 500, the external system 520, and the user devices 530A-530E, a social-networking application, a messaging application, a photo-sharing application, or any other suitable computing system or application. Although the examples discussed herein may be in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular examples, privacy settings for an object may specify a "blocked list" of users or other entities that should not be allowed to access certain information associated with the object. In particular examples, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular examples, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node corresponding to a particular photo may have a privacy setting specifying that the photo may be accessed only by users tagged in the photo and friends of the users tagged in the photo. In particular examples, privacy settings may allow users to opt in to or opt out of having their content, information, or actions stored/logged by the system 500, the external system 520, and the user devices 530A-530E, or shared with other systems. Although this disclosure describes using particular privacy settings in a particular manner, this disclosure contemplates using any suitable privacy settings in any suitable manner.

In particular examples, the system 500, the external system 520, and the user devices 530A-530E may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular examples, the system 500, the external system 520, and the user devices 530A-530E may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

emgIn particular examples, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular examples, different privacy settings may be provided for different user groups or user demographics.

In particular examples, the system 500, the external system 520, and the user devices 530A-530E may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular examples, privacy settings may allow a first user to specify (e.g., by opting out, by not opting in) whether the system 500, the external system 520, and the user devices 530A-530E may receive, collect, log, or store particular objects or information associated with the user for any purpose. In particular examples, privacy settings may allow the first user to specify whether particular applications or processes may access, store, or use particular objects or information associated with the user. The privacy settings may allow the first user to opt in or opt out of having objects or information accessed, stored, or used by specific applications or processes. The system 500, the external system 520, and the user devices 530A-530E may access such information in order to provide a particular function or service to the first user, without the system 500, the external system 520, and the user devices 530A-530E having access to that information for any other purposes. Before accessing, storing, or using such objects or information, the system 500, the external system 520, and the user devices 530A-530E may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the system 500, the external system 520, and the user devices 530A-530E.

In particular examples, a user may specify whether particular types of objects or information associated with the first user may be accessed, stored, or used by the system 500, the external system 520, and the user devices 530A-530E. As an example and not by way of limitation, the first user may specify that images sent by the first user through the system 500, the external system 520, and the user devices 530A-530E may not be stored by the system 500, the external system 520, and the user devices 530A-530E. As another example and not by way of limitation, a first user may specify that messages sent from the first user to a particular second user may not be stored by the system 500, the external system 520, and the user devices 530A-530E. As yet another example and not by way of limitation, a first user may specify that all objects sent via a particular application may be saved by the system 500, the external system 520, and the user devices 530A-530E.

In particular examples, privacy settings may allow a first user to specify whether particular objects or information associated with the first user may be accessed from the system 500, the external system 520, and the user devices 530A-530E. The privacy settings may allow the first user to opt in or opt out of having objects or information accessed from a particular device (e.g., the phone book on a user's smart phone), from a particular application (e.g., a messaging app), or from a particular system (e.g., an email server). The system 500, the external system 520, and the user devices 530A-530E may provide default privacy settings with respect to each device, system, or application, and/or the first user may be prompted to specify a particular privacy setting for each context. As an example and not by way of limitation, the first user may utilize a location-services feature of the system 500, the external system 520, and the user devices 530A-530E to provide recommendations for restaurants or other places in proximity to the user. The first user's default privacy settings may specify that the system 500, the external system 520, and the user devices 530A-530E may use location information provided from one of the user devices 530A-530E of the first user to provide the location-based services, but that the system 500, the external system 520, and the user devices 530A-530E may not store the location information of the first user or provide it to any external system. The first user may then update the privacy settings to allow location information to be used by a third-party image-sharing application in order to geo-tag photos.

In particular examples, privacy settings may allow a user to specify whether current, past, or projected mood, emotion, or sentiment information associated with the user may be determined, and whether particular applications or processes may access, store, or use such information. The privacy settings may allow users to opt in or opt out of having mood, emotion, or sentiment information accessed, stored, or used by specific applications or processes. The system 500, the external system 520, and the user devices 530A-530E may predict or determine a mood, emotion, or sentiment associated with a user based on, for example, inputs provided by the user and interactions with particular objects, such as pages or content viewed by the user, posts or other content uploaded by the user, and interactions with other content of the online social network. In particular examples, the system 500, the external system 520, and the user devices 530A-530E may use a user's previous activities and calculated moods, emotions, or sentiments to determine a present mood, emotion, or sentiment. A user who wishes to enable this functionality may indicate in their privacy settings that they opt in to the system 500, the external system 520, and the user devices 530A-530E receiving the inputs necessary to determine the mood, emotion, or sentiment. As an example and not by way of limitation, the system 500, the external system 520, and the user devices 530A-530E may determine that a default privacy setting is to not receive any information necessary for determining mood, emotion, or sentiment until there is an express indication from a user that the system 500, the external system 520, and the user devices 530A-530E may do so. By contrast, if a user does not opt in to the system 500, the external system 520, and the user devices 530A-530E receiving these inputs (or affirmatively opts out of the system 500, the external system 520, and the user devices 530A-530E receiving these inputs), the system 500, the external system 520, and the user devices 530A-530E may be prevented from receiving, collecting, logging, or storing these inputs or any information associated with these inputs. In particular examples, the system 500, the external system 520, and the user devices 530A-530E may use the predicted mood, emotion, or sentiment to provide recommendations or advertisements to the user. In particular examples, if a user desires to make use of this function for specific purposes or applications, additional privacy settings may be specified by the user to opt in to using the mood, emotion, or sentiment information for the specific purposes or applications. As an example and not by way of limitation, the system 500, the external system 520, and the user devices 530A-530E may use the user's mood, emotion, or sentiment to provide newsfeed items, pages, friends, or advertisements to a user. The user may specify in their privacy settings that the system 500, the external system 520, and the user devices 530A-530E may determine the user's mood, emotion, or sentiment. The user may then be asked to provide additional privacy settings to indicate the purposes for which the user's mood, emotion, or sentiment may be used. The user may indicate that the system 500, the external system 520, and the user devices 530A-530E may use his or her mood, emotion, or sentiment to provide newsfeed content and recommend pages, but not for recommending friends or advertisements. The system 500, the external system 520, and the user devices 530A-530E may then only provide newsfeed content or pages based on user mood, emotion, or sentiment, and may not use that information for any other purpose, even if not expressly prohibited by the privacy settings.

In particular examples, privacy settings may allow a user to engage in the ephemeral sharing of objects on the online social network. Ephemeral sharing refers to the sharing of objects (e.g., posts, photos) or information for a finite period of time. Access or denial of access to the objects or information may be specified by time or date. As an example and not by way of limitation, a user may specify that a particular image uploaded by the user is visible to the user's friends for the next week, after which time the image may no longer be accessible to other users. As another example and not by way of limitation, a company may post content related to a product release ahead of the official launch, and specify that the content may not be visible to other users until after the product launch.

In particular examples, for particular objects or information having privacy settings specifying that they are ephemeral, the system 500, the external system 520, and the user devices 530A-530E may be restricted in its access, storage, or use of the objects or information. The system 500, the external system 520, and the user devices 530A-530E may temporarily access, store, or use these particular objects or information in order to facilitate particular actions of a user associated with the objects or information, and may subsequently delete the objects or information, as specified by the respective privacy settings. As an example and not by way of limitation, a first user may transmit a message to a second user, and the system 500, the external system 520, and the user devices 530A-530E may temporarily store the message in a content data store until the second user has viewed or downloaded the message, at which point the system 500, the external system 520, and the user devices 530A-530E may delete the message from the data store. As another example and not by way of limitation, continuing with the prior example, the message may be stored for a specified period of time (e.g., 2 weeks), after which point the system 500, the external system 520, and the user devices 530A-530E may delete the message from the content data store.

In particular examples, privacy settings may allow a user to specify one or more geographic locations from which objects can be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user.

In particular examples, the system 500, the external system 520, and the user devices 530A-530E may have functionalities that may use, as inputs, personal or biometric information of a user for user-authentication or experience-personalization purposes. A user may opt to make use of these functionalities to enhance their experience on the online social network. As an example and not by way of limitation, a user may provide personal or biometric information to the system 500, the external system 520, and the user devices 530A-530E. The user's privacy settings may specify that such information may be used only for particular processes, such as authentication, and further specify that such information may not be shared with any external system or used for other processes or applications associated with the system 500, the external system 520, and the user devices 530A-530E. As another example and not by way of limitation, the system 500, the external system 520, and the user devices 530A-530E may provide a functionality for a user to provide voice-print recordings to the online social network. As an example and not by way of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to authenticate the user, to send voice messages, to improve voice recognition in order to use voice-operated features of the online social network), and further specify that such voice recording may not be shared with any external system or used by other processes or applications associated with the system 500, the external system 520, and the user devices 530A-530E. As another example and not by way of limitation, the system 500, the external system 520, and the user devices 530A-530E may provide a functionality for a user to provide a reference image (e.g., a facial profile, a retinal scan) to the online social network. The online social network may compare the reference image against a later-received image input (e.g., to authenticate the user, to tag the user in photos). The user's privacy setting may specify that such voice recording may be used only for a limited purpose (e.g., authentication, tagging the user in photos), and further specify that such voice recording may not be shared with any external system or used by other processes or applications associated with the system 500, the external system 520, and the user devices 530A-530E.

In particular examples, changes to privacy settings may take effect retroactively, affecting the visibility of objects and content shared prior to the change. As an example and not by way of limitation, a first user may share a first image and specify that the first image is to be public to all other users. At a later time, the first user may specify that any images shared by the first user should be made visible only to a first user group. The system 500, the external system 520, and the user devices 530A-530E may determine that this privacy setting also applies to the first image and make the first image visible only to the first user group. In particular examples, the change in privacy settings may take effect only going forward. Continuing the example above, if the first user changes privacy settings and then shares a second image, the second image may be visible only to the first user group, but the first image may remain visible to all users. In particular examples, in response to a user action to change a privacy setting, the system 500, the external system 520, and the user devices 530A-530E may further prompt the user to indicate whether the user wants to apply the changes to the privacy setting retroactively. In particular examples, a user change to privacy settings may be a one-off change specific to one object. In particular examples, a user change to privacy may be a global change for all objects associated with the user.

In particular examples, the system 500, the external system 520, and the user devices 530A-530E may determine that a first user may want to change one or more privacy settings in response to a trigger action associated with the first user. The trigger action may be any suitable action on the online social network. As an example and not by way of limitation, a trigger action may be a change in the relationship between a first and second user of the online social network (e.g., "un-friending" a user, changing the relationship status between the users). In particular examples, upon determining that a trigger action has occurred, the system 500, the external system 520, and the user devices 530A-530E may prompt the first user to change the privacy settings regarding the visibility of objects associated with the first user. The prompt may redirect the first user to a workflow process for editing privacy settings with respect to one or more entities associated with the trigger action. The privacy settings associated with the first user may be changed only in response to an explicit input from the first user, and may not be changed without the approval of the first user. As an example and not by way of limitation, the workflow process may include providing the first user with the current privacy settings with respect to the second user or to a group of users (e.g., un-tagging the first user or second user from particular objects, changing the visibility of particular objects with respect to the second user or group of users), and receiving an indication from the first user to change the privacy settings based on any of the methods described herein, or to keep the existing privacy settings.

In particular examples, a user may need to provide verification of a privacy setting before allowing the user to perform particular actions on the online social network, or to provide verification before changing a particular privacy setting. When performing particular actions or changing a particular privacy setting, a prompt may be presented to the user to remind the user of his or her current privacy settings and to ask the user to verify the privacy settings with respect to the particular action. Furthermore, a user may need to provide confirmation, double-confirmation, authentication, or other suitable types of verification before proceeding with the particular action, and the action may not be complete until such verification is provided. As an example and not by way of limitation, a user's default privacy settings may indicate that a person's relationship status is visible to all users (e.g., "public"). However, if the user changes his or her relationship status, the system 500, the external system 520, and the user devices 530A-530E may determine that such action may be sensitive and may prompt the user to confirm that his or her relationship status should remain public before proceeding. As another example and not by way of limitation, a user's privacy settings may specify that the user's posts are visible only to friends of the user. However, if the user changes the privacy setting for his or her posts to being public, the system 500, the external system 520, and the user devices 530A-530E may prompt the user with a reminder of the user's current privacy settings of posts being visible only to friends, and a warning that this change will make all of the user's past posts visible to the public. The user may then be required to provide a second verification, input authentication credentials, or provide other types of verification before proceeding with the change in privacy settings. In particular examples, a user may need to provide verification of a privacy setting on a periodic basis. A prompt or reminder may be periodically sent to the user based either on time elapsed or a number of user actions. As an example and not by way of limitation, the system 500, the external system 520, and the user devices 530A-530E may send a reminder to the user to confirm his or her privacy settings every six months or after every ten photo posts. In particular examples, privacy settings may also allow users to control access to the objects or information on a per-request basis. As an example and not by way of limitation, the system 500, the external system 520, and the user devices 530A-530E may notify the user whenever an external system attempts to access information associated with the user, and require the user to provide verification that access should be allowed before proceeding.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A system, comprising:
a processor; and
a memory storing instructions, which when executed by the processor, cause the processor to:
  determine, using at least one artificial intelligence (AI) model, relationships between objects in a field of view of a camera of a headset worn by a user;
  apply an artificial intelligence (AI) agent associated with the user to analyze the relationships determined by the at least one artificial intelligence (AI) model and generate a three-dimensional (3D) mapping that includes one or more objects within the field of view, wherein the artificial intelligence (AI) agent is personalized to the user based on previous user interactions with the artificial intelligence (AI) agent; and
  provide an output via at least one output modality of a plurality of output modalities, the at least one output modality determined by the artificial intelligence (AI) agent, to aid a user's perception and experience of the field of view, wherein the output is based on the three-dimensional (3D) mapping and includes a prediction, made by the artificial intelligence (AI) agent, for a user activity that is associated with the field of view.

2. The system of claim 1, wherein the instructions, when executed by the processor, further cause the processor to implement the artificial intelligence (AI) agent to conduct a localization and mapping analysis to generate the three-dimensional (3D) mapping.

3. The system of claim 1, wherein the headset is a pair of augmented reality (AR) glasses.

4. The system of claim 1, wherein the at least one artificial intelligence (AI) model comprises at least one of a large language model (LLM), a generative adversarial network (GAN), a tree-based model, a Bayesian network, a support vector, clustering, a kernel method, a spline, or a knowledge graph.

5. The system of claim 1, wherein generating the three-dimensional (3D) mapping includes:
   determining a location of each of the one or more objects relative to a location of the user based on, at least, the field of view.

6. The system of claim 1, wherein the instructions, when executed by the processor, further cause the processor to:
   receive image data of the field of view from the camera of the headset; and
   perform image analysis of the image data, wherein the determining the relationships between objects in the field of view is based on the image data.

7. The system of claim 1, wherein the instructions, when executed by the processor, further cause the processor to:
   determine a risk associated with the one or more objects, wherein the output is further based on the risk.

8. A method for supplementing user perception and experience, comprising:
   determining, using at least one artificial intelligence (AI) model, relationships between objects in a field of view of a camera of a headset worn by a user;
   applying an artificial intelligence (AI) agent associated with the user to analyze the relationships determined by the at least one artificial intelligence (AI) model and generating a three-dimensional (3D) mapping that includes one or more objects within the field of view, wherein the artificial intelligence (AI) agent is personalized to the user based on previous user interactions with the artificial intelligence (AI) agent; and
   providing an output via at least one output modality of a plurality of output modalities, the at least one output modality determined by the artificial intelligence (AI) agent, to aid a user's perception and experience of the field of view wherein the output is based on the three-dimensional (3D) mapping and includes a prediction, made by the artificial intelligence (AI) agent, for a user activity that is associated with the field of view.

9. The method of claim 8, further comprising implementing the artificial intelligence (AI) agent to conduct a localization and mapping analysis to generate the three-dimensional (3D) mapping.

10. The method of claim 8, wherein the headset is a pair of augmented reality (AR) glasses.

11. The method of claim 8, wherein the at least one artificial intelligence (AI) model comprises at least one of a large language model (LLM), a generative adversarial network (GAN), a tree-based model, a Bayesian network, a support vector, clustering, a kernel method, a spline, or a knowledge graph.

12. The method of claim 8, wherein generating the three-dimensional (3D) mapping includes:
   determining a location of each of the one or more objects relative to a location of the user based on, at least, the field of view.

13. The method of claim 8, further comprising:
   receiving image data of the field of view from the camera of the headset; and
   performing image analysis of the image data, wherein the determining the relationships between objects in the field of view is based on the image data.

14. A non-transitory computer-readable storage medium having an executable stored thereon, which when executed instructs a processor to:
   determine, using at least one artificial intelligence (AI) model, relationships between objects in a field of view of a camera of a headset worn by a user;
   apply an artificial intelligence (AI) agent associated with the user to analyze the relationships determined by the at least one artificial intelligence (AI) model and generate a three-dimensional (3D) mapping that includes one or more objects within the field of view, wherein the artificial intelligence (AI) agent is personalized to the user based on previous user interactions with the artificial intelligence (AI) agent; and
   provide an output via at least one output modality of a plurality of output modalities, the at least one output modality determined by the artificial intelligence (AI) agent, to aid a user's perception and experience of the field of view, wherein the output is based on the three-dimensional (3D) mapping and includes a prediction, made by the artificial intelligence (AI) agent, for a user activity that is associated with the field of view.

15. The non-transitory computer-readable storage medium of claim 14, wherein the executable when executed further instructs the processor to implement the artificial intelligence (AI) agent to conduct a localization and mapping analysis to generate the three-dimensional (3D) mapping.

16. The non-transitory computer-readable storage medium of claim 14, wherein generating the three-dimensional (3D) mapping includes:
   determining a location of each of the one or more objects relative to a location of the user based on, at least, the field of view.

17. The non-transitory computer-readable storage medium of claim 14, wherein the executable when executed further instructs the processor to:
   receive image data of the field of view from the camera of the headset; and
   perform image analysis of the image data, wherein the determining the relationships between objects in the field of view is based on the image data.

18. The non-transitory computer-readable storage medium of claim 14, wherein the executable when executed further instructs the processor to:
   determine a risk associated with the one or more objects, wherein the output is further based on the risk.

19. The non-transitory computer-readable storage medium of claim 14, wherein the headset is a pair of augmented reality (AR) glasses.

20. The non-transitory computer-readable storage medium of claim 14, wherein the at least one artificial intelligence (AI) model comprises at least one of a large language model (LLM), a generative adversarial network (GAN), a tree-based model, a Bayesian network, a support vector, clustering, a kernel method, a spline, or a knowledge graph.

* * * * *